United States Patent [19]
Ito

[11] Patent Number: 5,537,959
[45] Date of Patent: Jul. 23, 1996

[54] LUBRICATING SYSTEM FOR ENGINE

[75] Inventor: Takeshi Ito, Iwata, Japan

[73] Assignee: Yamaha Hatsudoki Kabushiki Kaisha, Iwata, Japan

[21] Appl. No.: 287,908

[22] Filed: Aug. 9, 1994

[30]     Foreign Application Priority Data

Aug. 9, 1993 [JP] Japan .................... 5-217995

[51] Int. Cl.⁶ ............................................ F01M 1/02
[52] U.S. Cl. ........................................... 123/73 AD
[58] Field of Search ......................... 123/73 AD, 196 R

[56]              References Cited

U.S. PATENT DOCUMENTS

| | | |
|---|---|---|
| 2,253,152 | 8/1941 | Towler et al. . |
| 2,796,075 | 6/1957 | Focht . |
| 3,302,752 | 2/1967 | Nobou Shikawa . |
| 3,396,151 | 8/1968 | Kato et al. . |
| 3,435,612 | 4/1969 | Hensler . |
| 3,447,636 | 6/1969 | Bonfilio . |
| 3,779,225 | 12/1973 | Watson et al. . |
| 3,938,425 | 2/1976 | Kroffke . |
| 4,094,293 | 6/1978 | Evans . |

(List continued on next page.)

FOREIGN PATENT DOCUMENTS

| | | |
|---|---|---|
| 0275715 | 12/1987 | European Pat. Off. . |
| 0376815 | 12/1989 | European Pat. Off. . |
| 0381162 | 8/1990 | European Pat. Off. . |
| 0577081 | 1/1994 | European Pat. Off. . |
| 1400280 | 4/1965 | France . |
| 949855 | 9/1956 | Germany . |
| 2411513 | 9/1975 | Germany . |
| 3025002 | 2/1981 | Germany . |
| 3909772 | 3/1989 | Germany . |
| 5716212 | 1/1982 | Japan . |
| 5996411 | 6/1984 | Japan . |
| 62-131908 | 6/1987 | Japan . |
| 0104711 | 2/1988 | Japan . |
| 6445912 | 2/1989 | Japan . |
| 192505 | 4/1989 | Japan . |
| 2191807 | 7/1990 | Japan . |
| 2118111 | 9/1990 | Japan . |
| 2118110 | 9/1990 | Japan . |
| 2139307 | 11/1990 | Japan . |
| 2151313 | 7/1985 | United Kingdom . |
| 2198191 | 8/1988 | United Kingdom . |
| 2270540 | 3/1994 | United Kingdom . |
| 9220909 | 11/1992 | WIPO . |

OTHER PUBLICATIONS

PATENT ABSTRACTS OF JAPAN vol. 13, No. 289 (M–845) 5 Jul. 1989 & JP–A–01 083 807 (FUJI HEAVY IND) 29 Mar. 1989.
European Search Report dated Nov. 7, 1994.
European Search Report dated Jun. 24, 1992 w/Patent Abstract of Japan, vol. 12, No. 121 (M–686) (2968) 15 Apr. 1988 & JP–A–62 248 812 (NIPPON SOKEN INC) 29 Oct. 1987.
Eurpoean Search Report dated Oct. 19, 1992.
European Search Report dated May 7, 1993 w/Patents Abstracts of Japan, vol. 12, No. 121 (M–686) (2968) 15 Apr. 1988 & JP–A–62 248 812 (Nippon Soken Inc) 29 Oct. 1987/vol. 10, No. 204 (M–499) (2260) 17 Jul. 1986 & JP–A–61 46 409 (MADZA MOTOR CORP) 6 March 1986.
European Search Report dated Apr. 3, 1993 w/JP–A–60 88 811 (SANSHIN KOGYO K.K.) 18 May 1985.
European Search Report date Oct. 18, 1993.

*Primary Examiner*—Marguerite McMahon
*Attorney, Agent, or Firm*—Knobbe, Martens, Olson & Bear

[57]            ABSTRACT

A motor vehicle containing a two-cycle, crankcase compression, internal combustion engine having direct lubricating systems for supplying lubricant to the sliding surfaces of the piston and cylinder bore for each cylinder of the engine, separate pumps for delivering lubricant to the crankshaft bearings associated with each cylinder of the engine and a system for delivering lubricant to the engine for the remaining components through the induction system. Various arrangements are disclosed for delivering the lubricant to the induction system including systems having a separate pump for each cylinder and combined arrangements.

14 Claims, 24 Drawing Sheets

U.S. PATENT DOCUMENTS

| | | |
|---|---|---|
| 4,199,950 | 4/1980 | Hakanson et al. . |
| 4,286,632 | 9/1981 | Abel . |
| 4,369,743 | 1/1983 | Holt et al. . |
| 4,385,614 | 5/1983 | Eheim et al. . |
| 4,446,833 | 5/1984 | Matsushita et al. . |
| 4,452,188 | 6/1984 | Kosuda et al. . |
| 4,480,602 | 11/1984 | Kobayashi et al. . |
| 4,506,337 | 3/1985 | Yasuhara . |
| 4,512,298 | 4/1985 | Hayashi . |
| 4,531,485 | 7/1985 | Murther . |
| 4,533,301 | 8/1985 | Foster . |
| 4,539,949 | 9/1985 | Walsworth . |
| 4,551,076 | 11/1985 | Dubois . |
| 4,563,988 | 1/1986 | Weishaupt . |
| 4,630,085 | 12/1986 | Misawa et al. ............ 123/73 AD |
| 4,655,183 | 4/1987 | Taira et al. . |
| 4,697,553 | 10/1987 | Lie . |
| 4,700,671 | 10/1987 | Matsushita . |
| 4,706,193 | 11/1987 | Imajo et al. . |
| 4,715,791 | 12/1987 | Berlin et al. . |
| 4,726,330 | 2/1988 | Shiga . |
| 4,730,580 | 3/1988 | Matsushita .................. 123/73 AD |
| 4,758,130 | 7/1988 | Waterworth . |
| 4,829,967 | 5/1989 | Nuti . |
| 4,887,559 | 12/1989 | Hensel et al. . |
| 4,893,598 | 1/1990 | Stasuik . |
| 4,904,163 | 2/1990 | Tachi et al. . |
| 4,944,658 | 7/1990 | Buttner . |
| 4,967,700 | 11/1990 | Torigai . |
| 4,989,555 | 2/1991 | Matsuo et al. . |
| 5,052,355 | 10/1991 | Ito et al. . |
| 5,069,177 | 12/1991 | Dokonal . |
| 5,094,196 | 3/1992 | Tsurutani et al. . |
| 5,156,120 | 10/1992 | Kent . |
| 5,195,476 | 3/1993 | Schwarz . |
| 5,197,424 | 3/1993 | Blum . |
| 5,235,944 | 8/1983 | Adachi . |
| 5,370,089 | 12/1994 | Harada ....................... 123/73 AD |
| 5,375,573 | 12/1994 | Bowman ..................... 123/73 AD |

LUBRICATING SYSTEM FOR ENGINE

BACKGROUND OF THE INVENTION

This invention relates to a lubricating system for an engine and more particularly to an improved lubricating system for a multi-cylinder, two-cycle, crankcase compression, internal combustion engine.

The advantages of two-cycle crankcase compression internal combustion engines for a wide variety of applications due to their simplicity and high specific output are well acknowledged. However, because of the way in which a two-cycle engine is normally lubricated, there has been concern about the use of such engines. That is, unlike four-cycle engines wherein the lubrication system for the engine includes a reservoir and the recirculation of the lubricant, with a two-cycle engine it has been the practice to supply lubricant to the engine which is consumed through lubrication and subsequent burning in the engine and then is discharged to the atmosphere.

More basic two-cycle engines are lubricated simply by mixing lubricant with the fuel and supplying the fuel, lubricant mixture to the engine through the crankcase so that all of the moving components of the engine will be lubricated. Such systems, however, have a number of disadvantages. Specifically, the amount of lubricant required for lubrication varies with engine running conditions and it is not possible with the fuel lubricant mixtures to meet all running requirements. Therefore, the fuel lubricant mixture has been richer in lubricant than necessary so as to ensure adequate lubrication under high speed, high load conditions. However, under other running conditions excess amounts of lubricant are consumed and may be discharged to the atmosphere.

There have, therefore, been proposed direct lubricating systems wherein the lubricant is supplied to the engine in a manner other than by mixing it with the fuel. In these systems the fuel may be introduced into the induction system and/or may be introduced into the engine through the induction system and at other specific points for direct lubrication. With this type of arrangement, it is possible to control the amount of lubricant supplied in response to engine conditions more accurately than when it is mixed with the fuel in a fixed ratio.

However, even the direct lubricating systems have disadvantages and can be improved upon. Specifically, various components of the engine may and do, in fact, require different amounts of lubricant under varying running conditions. The previously proposed systems have not permitted control of the amount of lubricant supplied to the individual components of the engine independently of each other.

It is, therefore, a principal object of this invention to provide an improved lubricating system for a crankcase compression two-cycle internal combustion engine.

It is a further object of this invention to provide an improved lubricating system for a two-cycle crankcase compression internal combustion engine wherein various components of the engine are supplied with differing amounts of lubricant, depending upon their specific needs.

It is a still further object of this invention to provide an improved direct lubricating system for an engine wherein different lubricant supplies are provided for different parts of the engine.

In addition to the individual components of the engine having different lubricant requirements under the same running conditions, it has also been observed that those components associated with one cylinder of the engine can have different lubricating requirements that those same components but associated with a different cylinder of the engine. This is due to a wide variety of reasons, but nevertheless is a phenomena that is acknowledged. In addition, the relative requirements of lubricant for the same component for different cylinders may not vary in the same relationship as the running parameters.

It is, therefore, a still further object of this invention to provide an improved lubricating system for a multiple cylinder engine of a two-cycle, crankcase compression type wherein the amount of lubricant supplied to the same components of different cylinders can be varied as required.

SUMMARY OF THE INVENTION

This invention is adapted to be embodied in a lubricating system for a two-cycle, crankcase compression, internal combustion engine that is comprised of a cylinder having at least one cylinder bore. A piston is reciprocally supported in the cylinder bore and is connected for driving a crankshaft rotatable in a crankcase chamber formed at one end of the cylinder bore. A cylinder head is affixed to the cylinder at the other end of the cylinder bore and defines with the piston and cylinder bore a combustion chamber. Intake means are provided for supplying an air charge to the crankcase chamber and a reed valve is positioned in the intake means for permitting flow into the crankcase chamber upon expansion and for precluding reverse flow upon compression. Scavenge passage means are provided for transferring the charge compressed in the crankcase chamber to the combustion chamber. A first lubricating system is provided for delivering lubricant directly to the cylinder bore for lubricating the sliding surfaces of the piston and the cylinder bore. A second lubricating system delivers lubricant to the induction system upstream of the reed valve for indirect lubrication of the other components of the engine.

DETAILED DESCRIPTION OF THE PREFERRED EMBODIMENTS OF THE INVENTION

EMBODIMENTS OF FIGS. 1–22

The Basic Engine Construction (FIGS. 1–12)

Figure 1:
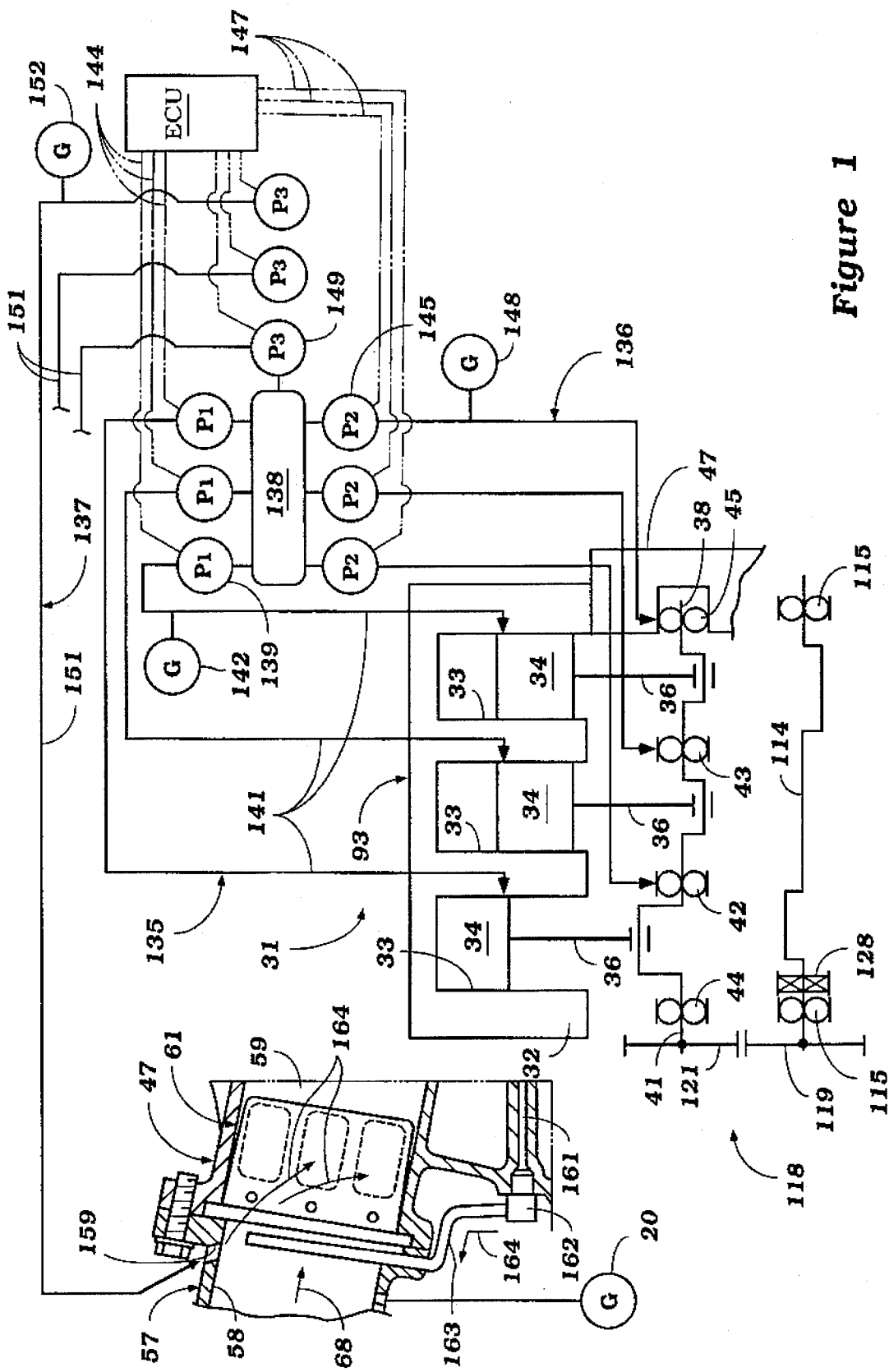
FIG. 1 is a partially schematic, partially cross-sectional view showing an internal combustion engine and lubricating system constructed in accordance with a first embodiment of the invention.

Referring initially primarily to FIGS. 1–4, a two-stroke, crankcase compression, internal combustion engine constructed and operated in accordance with an embodiment of the invention is indicated generally by the reference numeral 31. Although the invention is described in conjunction with a crankcase compression engine, it will be apparent to those skilled in the art that certain facets of the invention may be employed in conjunction with other types of engines. The invention, however, has particular utility and conjunction with two-cycle, crankcase compression engines because it relates to a lubricating system that has particular utility with such engines. It is to be understood, however, that some facets of the invention may also be employed with other reciprocating machines than engines.

The engine 31 has a cylinder block assembly 32 that is provided with three cylinders bores 33 which, in the illustrated embodiment, are inclined slightly from a vertical plane in a forward direction when installed in a vehicle. Although the invention is described in conjunction with three cylinder engines having such an orientation, it will also be apparent to those skilled in the art how the invention can be applied to engines having other numbers of cylinders and other orientation of these cylinders such as V-type, opposed, etc. The invention does, however, have particular utility in conjunction with multiple cylinder engines.

Pistons 34 are slidably supported within each of the cylinder bores 33 and are connected by means of piston pins 35 to respective connecting rods, indicated generally by the reference numeral 36. The lower or big ends 37 of the connecting rods 36 are journalled on the individual throws 38 of a crankshaft, indicated generally by the reference numeral 39. The crankshaft 39 has main bearings 41 that are journalled within intermediate main bearings 42 and 43 and end main bearings 44 and 45.

The crankshaft 39 rotates in a crankcase chamber 46 of a crankcase assembly 47 which is formed by a skirt 48 of the cylinder block 32 and a crankcase member 49 that is detachably connected thereto in a well known manner. The throws 38 have counterweight portions 51 and the configuration of the crankcase chamber 46 is such as to maintain as small a clearance volume as possible, as is desirable with two-cycle engine practice. As is also typical with two cycle engine practice, the areas of the crankcase chamber 46 associated with each of the cylinder bores 33 are sealed from each other by seals 52 that are disposed between the respective main bearings 42, 43, 44 and 45 as is well known in this art.

Figure 3:
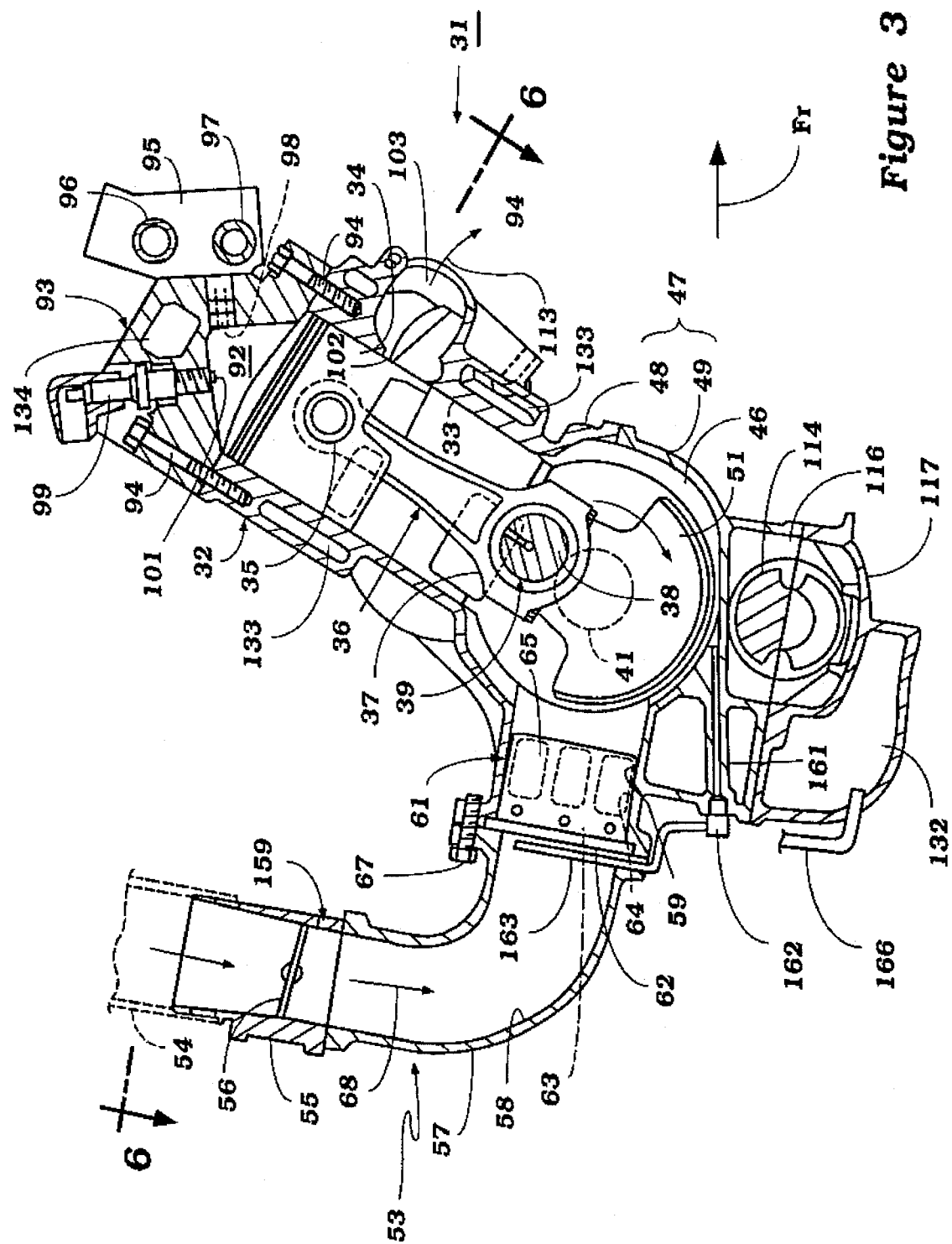
FIG. 3 is a cross-sectional view of the engine taken along the line 3—3 of FIG. 2 and shows a portion of the engine which is also shown in cross section in FIG. 1.
Figure 4:
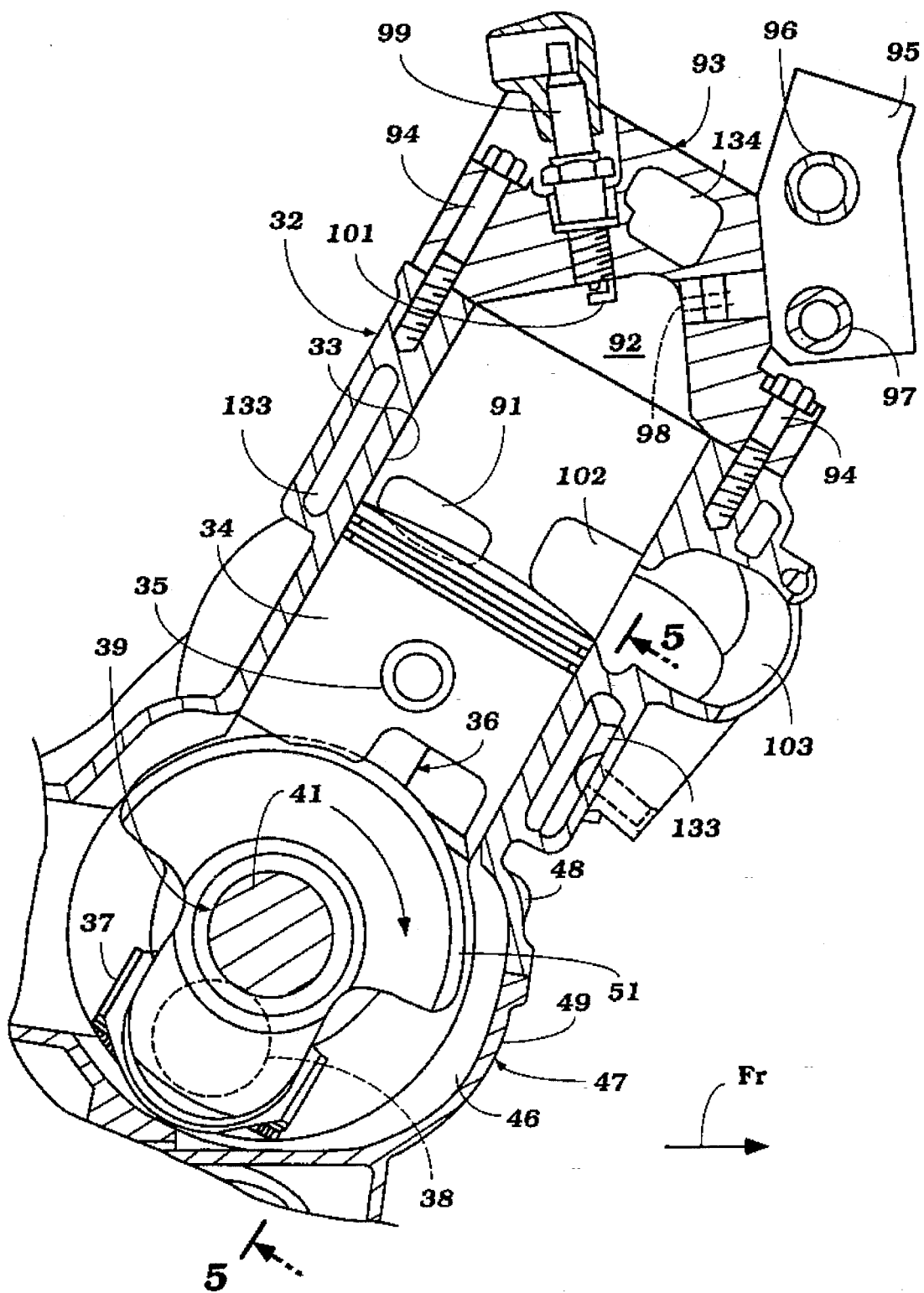
FIG. 4 is a further enlarged cross-sectional view taken along the same plane as FIG. 3.
Figure 5:
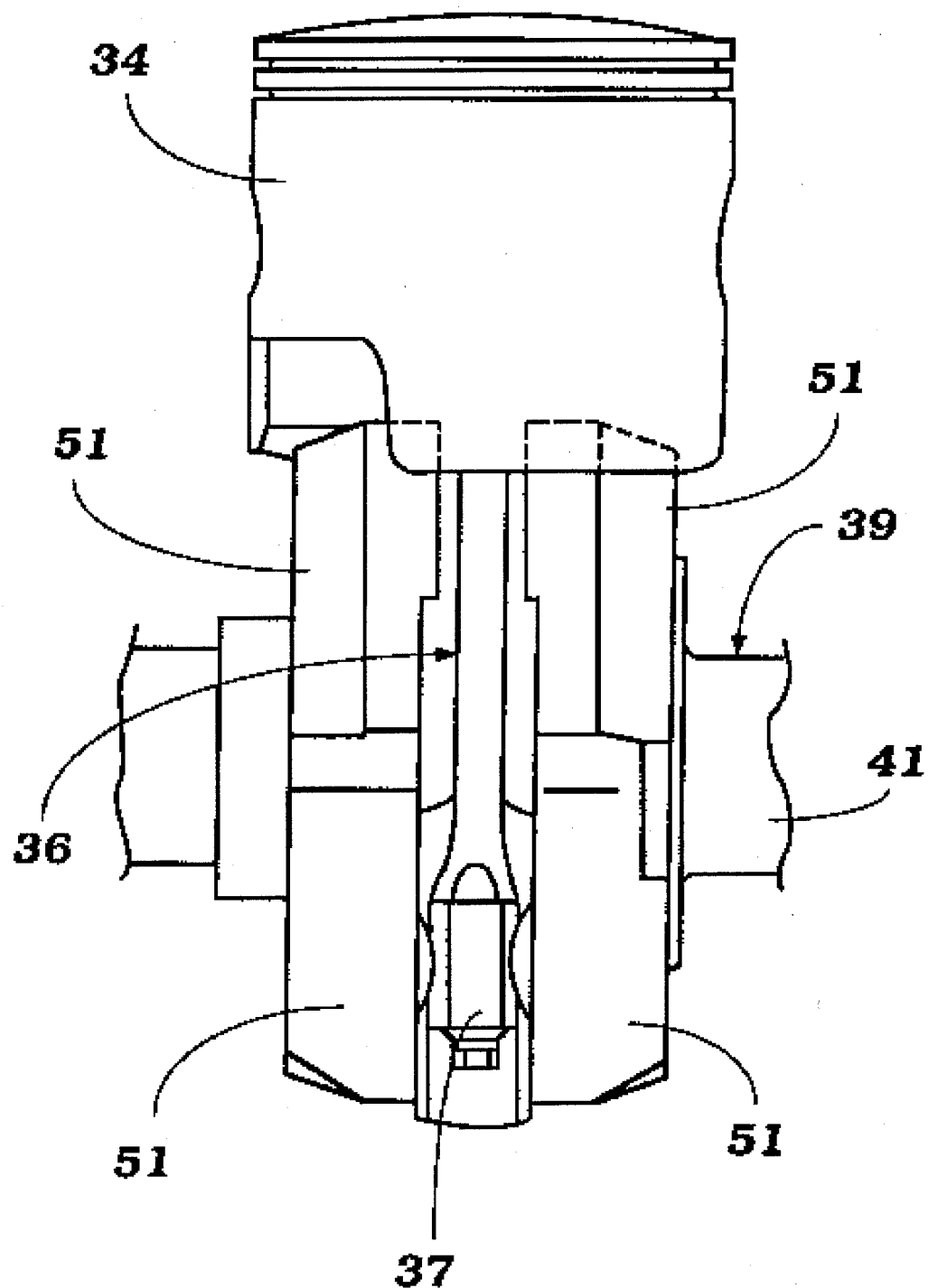
FIG. 5 is a side elevational view of the piston and connecting rod and looks generally in a direction of the arrows 5 in FIG. 4.
Figure 6:
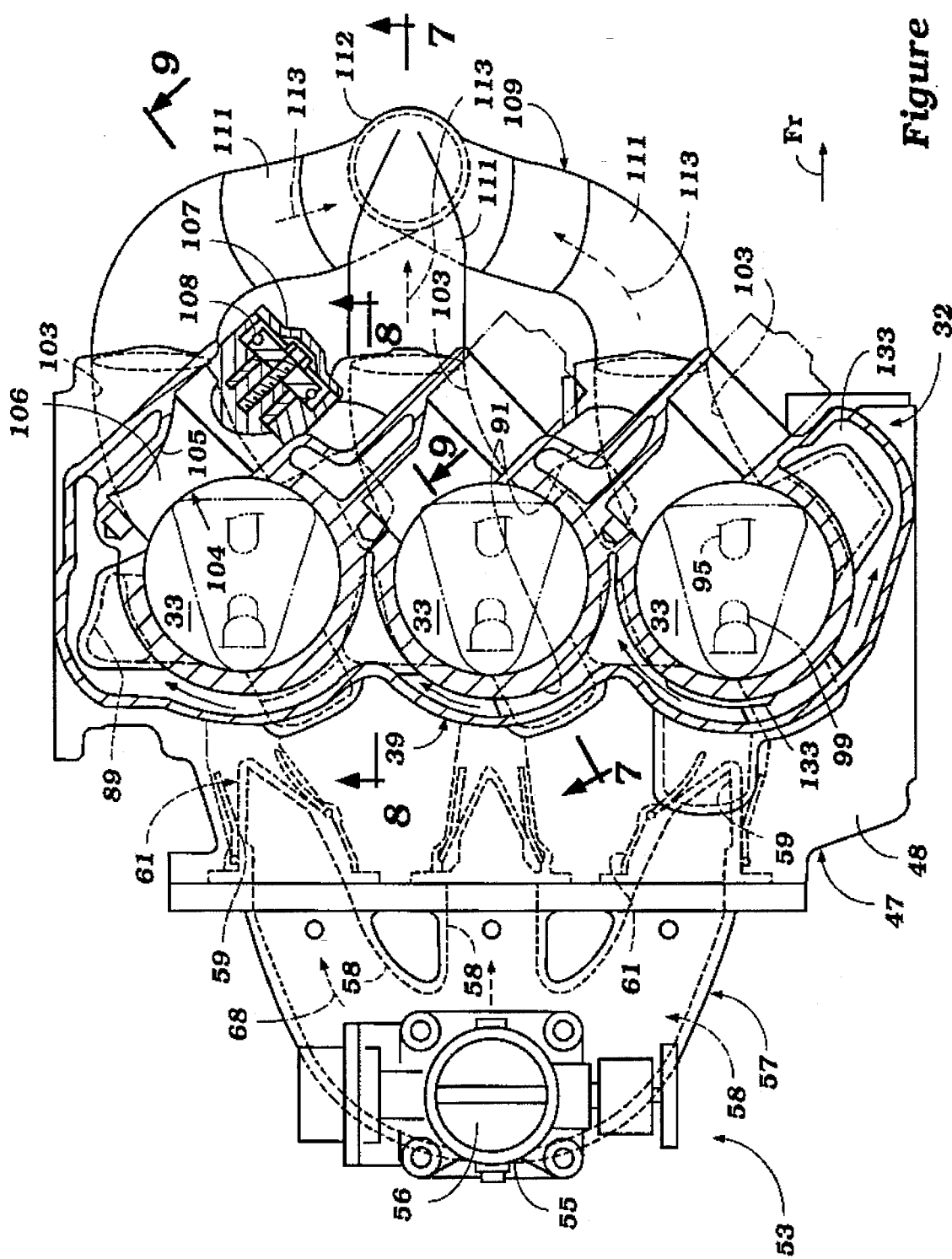
FIG. 6 is a cross-sectional view taken along the line 6—6 of FIG. 3.
Figure 7:
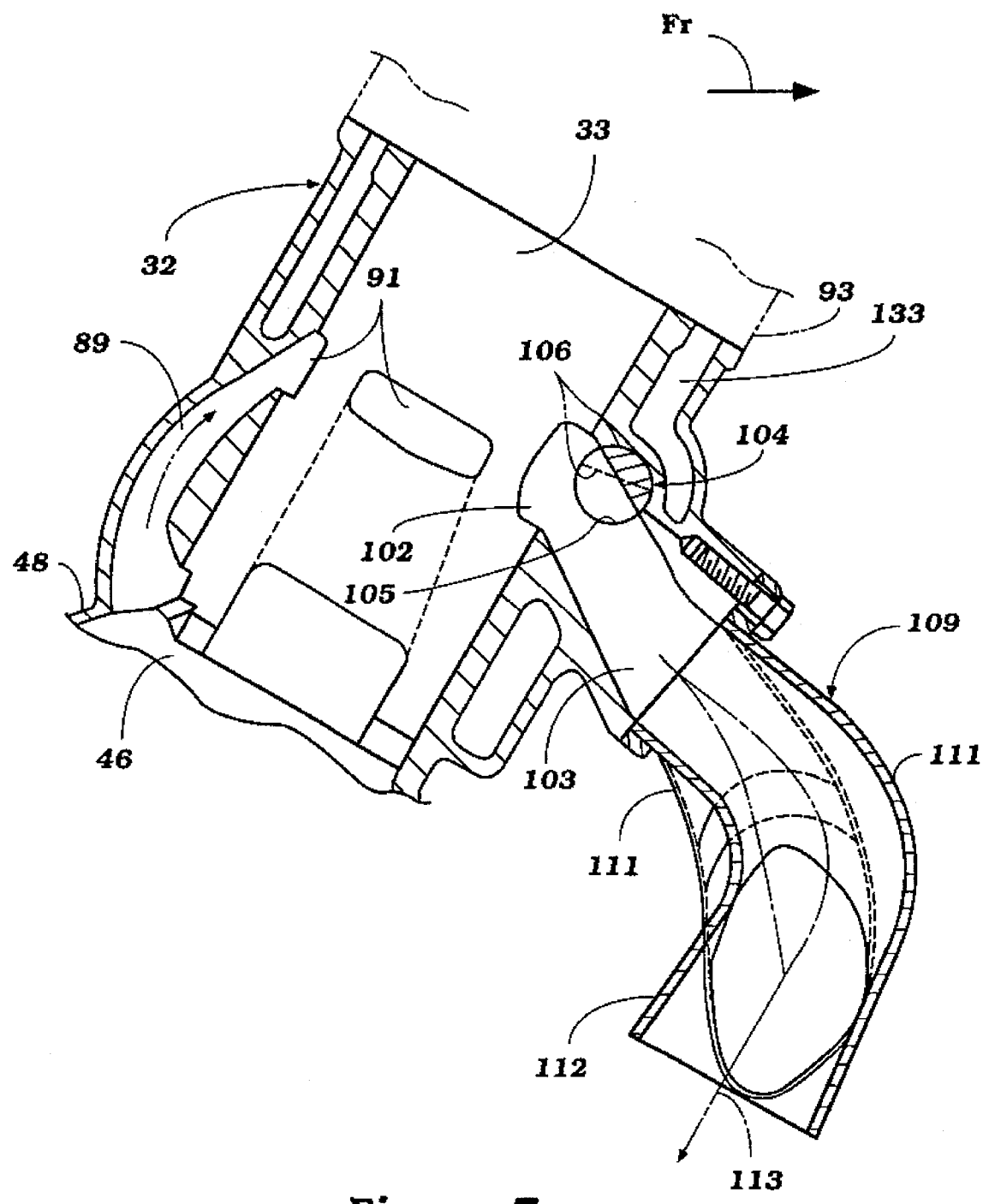
FIG. 7 is a cross-sectional view taken along the line 7—7 of FIG. 6.
Figure 8:
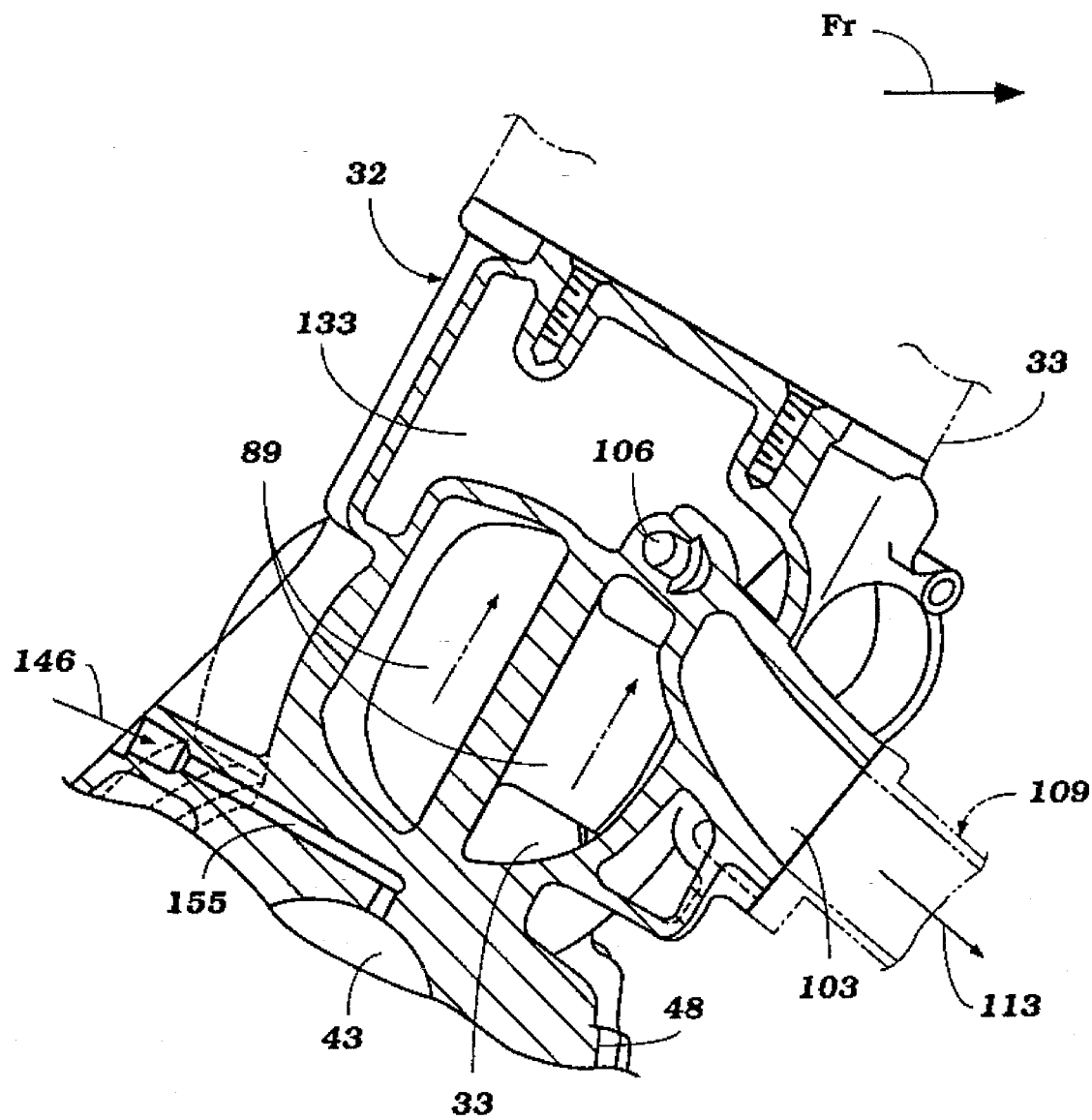
FIG. 8 is a cross-sectional view taken along the line 8—8 of FIG. 6.

An intake charge is deliver to the individual crankcase chambers 46 by an induction system, indicated generally by the reference numeral 53 and shown in most detail in FIG. 3. This induction system 53 also appears in FIGS. 6 and 11 partially in the latter case. The induction system 53 receives air from a vehicle air inlet silencer and cleaner (to be described later by reference to FIGS. 13–20) through a duct 54 shown in phantom in FIG. 3.

The duct 54 communicates with a throttle body 55 in which a single manually positioned throttle valve 56 is positioned for controlling the speed of the engine 31 in a well-known manner. The throttle valve 56 is controlled through a suitable linkage system (not shown).

The throttle body 55 communicates with an inlet opening of an intake manifold indicated generally by the reference numeral 57 and having individual runners 58 each of which terminates at a respective intake port 59 formed in the crankcase 47 in communication with the respective crankcase chamber 46. Reed type check valve assembly 61 comprised of a caging member 62 that has a V-shaped configuration and which defines a recess 63 between its angularly disposed sides. These sides have openings 64 with the flow through these openings being controlled by reed type valve elements 65 that are fixed to the caging member 62 in a well known manner. Threaded fasteners 66 maintain the manifold 57 to the crankcase assembly 47 with the reed type valve caging member 62 being sandwiched therebetween.

As the pistons 34 move upwardly in the cylinder bores 33 they will cause a pressure drop in the respective crankcase chambers 46 causing air to flow through the induction system 53 in the direction indicated by the broken arrows 68 in certain of the figures. This air then enters the crankcase chambers 46 through the opening of the reed valve assemblies 61.

As the pistons 34 move downwardly this charge will be compressed and then forced through scavenge passages 89 (FIG. 7) formed around the circumference of each of the cylinder bores 33 in the cylinder block 32. This charge will then enter the cylinder bores 33 through scavenge ports 91 formed circumferentially around the cylinder bores 33.

Referring now again primarily to FIGS. 1–4, this charge exiting the scavenge ports 91 enters a combustion chamber that is formed by the cylinder bore 33 above the heads of the pistons 34 and combustion chamber recesses 92 formed in a cylinder head assembly, indicated generally by the reference numeral 93, that is affixed to the cylinder block 32 by fasteners 94. This charge is further compressed as the pistons 34 move upwardly in the cylinder bores 33.

In the illustrated embodiment, the engine 31 is supplied with fuel by direct cylinder injection via air/fuel injectors, indicated generally by the reference numeral 95. In the illustrated embodiment, the injectors are air/fuel injectors and receive fuel, from a system to be described when the vehicle is described by reference to FIG. 13–20 from a fuel conduit 96 and compressed air from an air supply system, also to be described by reference to the vehicle, including a supply conduit 97. The air/fuel injectors 95 are mounted in the cylinder head 93 and have nozzle portions 98 which are disposed so as to inject fuel and compressed air into the cylinder head recesses 92. Any form of known air/fuel injector may employed as the injectors 95.

Alternatively, only fuel may be injected into the combustion chambers 92 by the injectors 95. Also, rather than employing direct cylinder injection fuel may be injected elsewhere into the induction system or, if desired, the invention may be employed with carbureted engines. In the illustrated embodiment, the engine is spark ignited although it should be readily apparent to those skilled in the art that the invention may also be employed in conjunction with diesel engines.

The combustible charge delivered to the combustion chambers, including the cylinder head recesses 92, is fired by means of spark plugs 99 that are affixed to the cylinder head 93 and have their gaps 101 extending into the cylinder head recesses 92. The spark plugs 99 are fired by any suitable ignition system.

The ignited charge will burn and expand to drive the pistons 34 downwardly and drive the crankshaft 39. Eventually, the downward movement of the pistons will open exhaust ports 102 for discharge through an exhaust system which will now be described by particular reference to FIGS. 3, 4 and 6–9. This exhaust system includes exhaust passages 103 that extend through the cylinder block 32 on the side opposite the scavenge passages 91 so that the scavenging charge will cause a Schnurl type of scavenging in the combustion chamber.

Exhaust control valves, indicated generally by the reference numeral 104, are mounted in the sides of the exhaust passages 103 adjacent the exhaust ports 102. These exhaust valves 104 are mounted in bores 105 that extend transversely to the cylinder bores 33 and contain rotary valve elements that have a cutout portion 106 which when rotated will obscure a portion of the upper part of the exhaust ports 102 so as to in effect delay the opening of the exhaust ports on downward movement of the piston and advance the closing of the exhaust ports 102 on the upward movement of the piston so as to in effect increase the effective compression ratio of the engine. Any desired type of strategy can be employed for so positioning the exhaust valve elements 106 and controlling the compression ratio to achieve the desired result.

Figure 9:
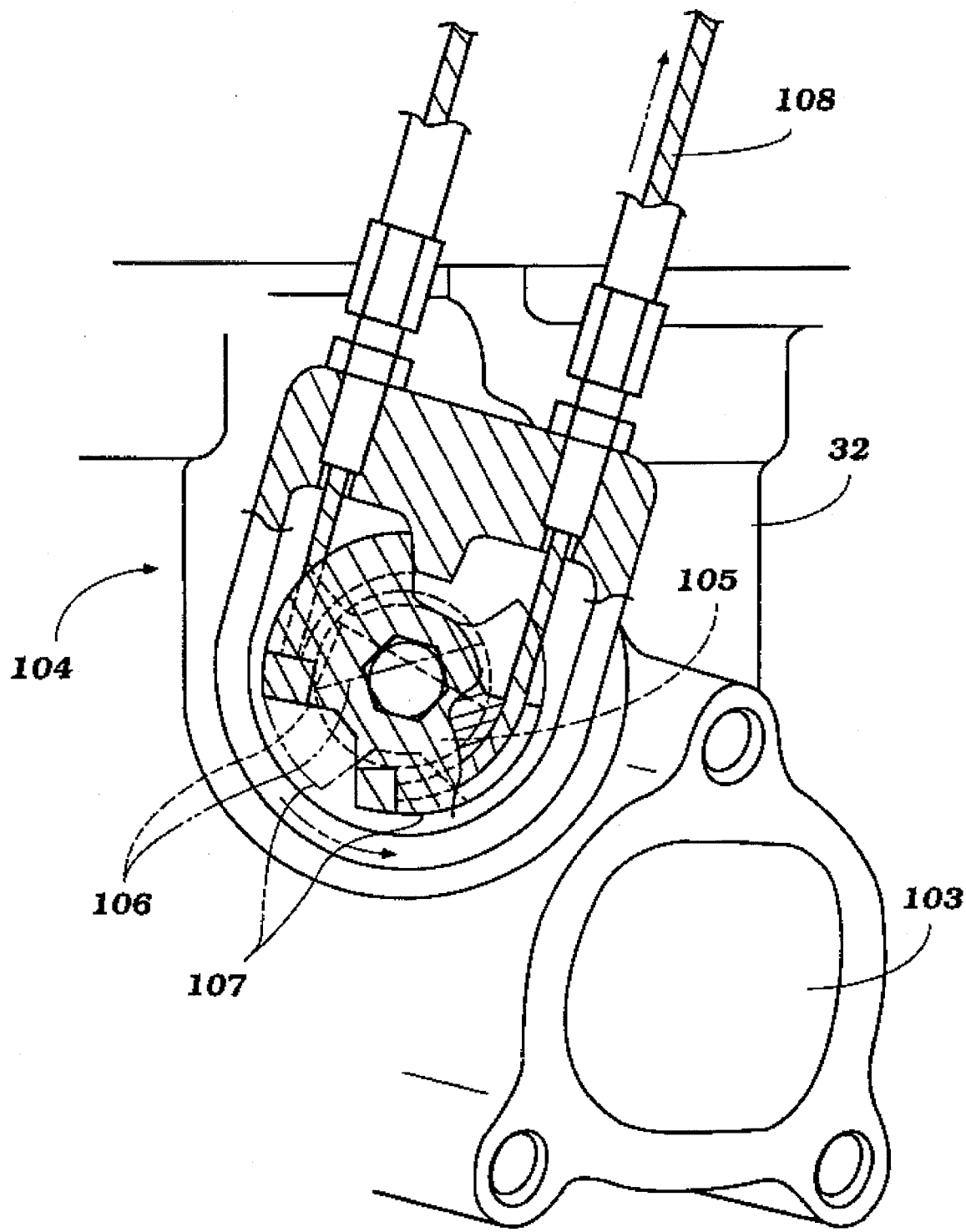
FIG. 9 is a cross-sectional view taken generally along the line 9—9 of FIG. 6 and shows the actuating mechanism for one of the exhaust control valves in more detail.

Referring specifically to FIG. 9, the exhaust control valve elements 106 have end portions to which a pulley 107 is affixed. A wire transmitter 108 is connected to this pulley and is connected at its opposite end to a servomotor (not shown) that is operated by any known type of control strategy for appropriately varying the compression ratio. The compression ratio may be lowered at high speed, high load conditions and maintain higher at low speed, low load conditions in order to minimize thermal loading on the engine in one form of strategy.

An exhaust system including an exhaust manifold, indicated generally by the reference numeral 109, is attached to the cylinder block 32 and communicates with an exhaust system for discharging exhaust gases to the atmosphere which exhaust system will be described later by reference to FIGS. 13–19.

The exhaust manifold 109 includes individual runner sections 111 each extending from a respective one of the exhaust passages 103 and terminating in a downwardly facing common collector section 112. The exhaust gases flow in the direction of the arrow 113.

In order to promote smooth running and minimum vibrations generated from the engine 31, it is provided with a balancer shaft 114, the construction and operation of which may be best understood by reference to FIGS. 1–3, 10 and 11. This balancer shaft 114 is rotatably journalled by means of a pair of spaced apart bearings 115 disposed in the front and rear walls of the crankcase forming number 82 and which is contained within a chamber 116 that is disposed adjacent but separated from the crankcase chamber 46 by an integral wall. The lower portion of this chamber 116 is enclosed by a lower wall 117.

Forwardly of the forwardmost bearing 115, a transmission assembly, indicated generally by the reference numeral 118, is provided for driving the balancer shaft 114 at the same speed but in an opposite direction to the crankshaft 39. This transmission 118 includes a first gear 119 that is affixed in a manner to be described to the outer end of the balancer shaft 114 and a second gear 121 which is affixed for rotation with the crankshaft 39. This transmission 118 is contained within a transmission cavity 122 formed in part by a front wall 123.

Figure 10:
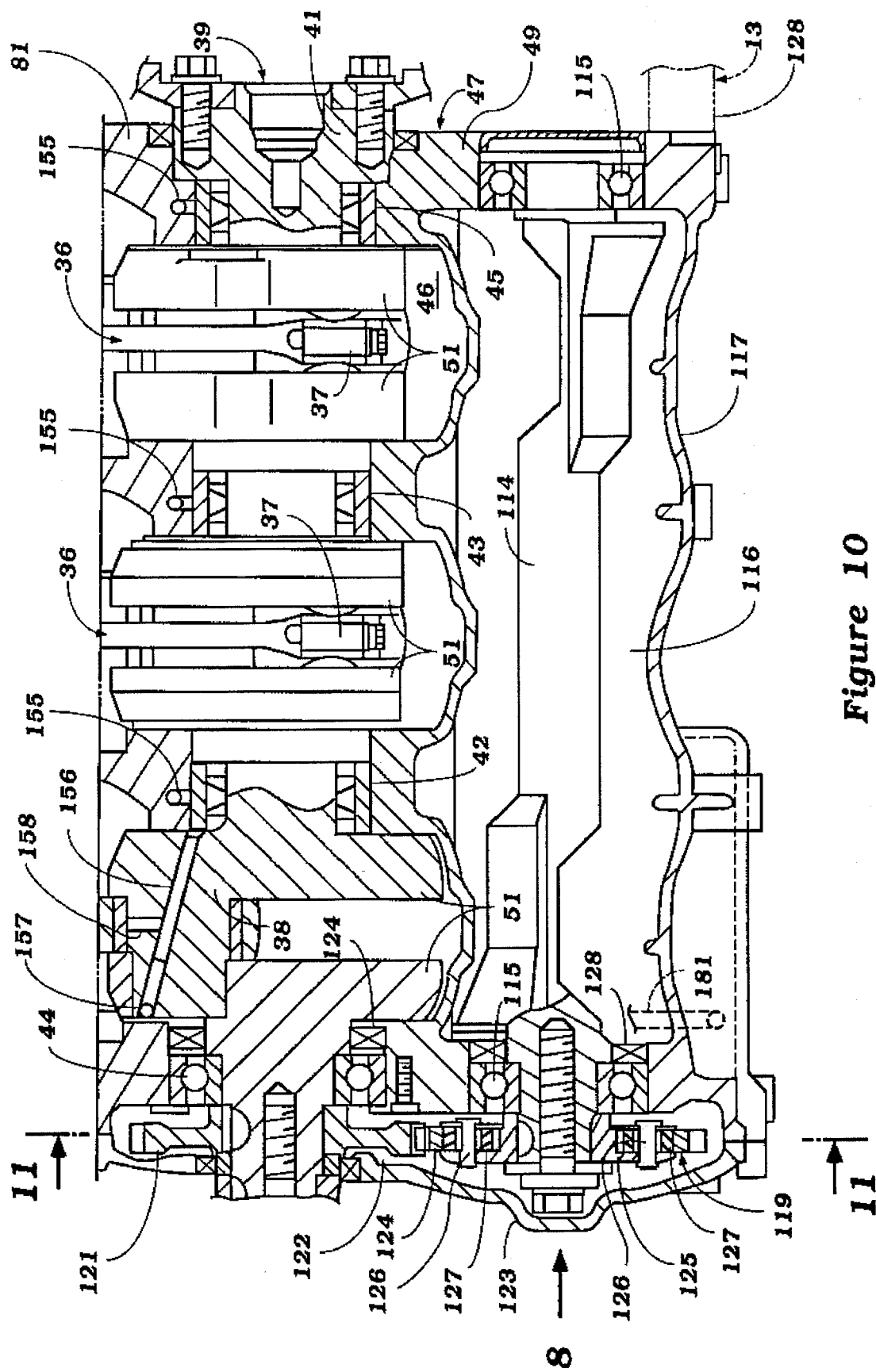
FIG. 10 is a further enlarged cross-sectional view of a portion of FIG. 2 showing the crankshaft and balance shaft and drive arrangement therebetween.
Figure 11:
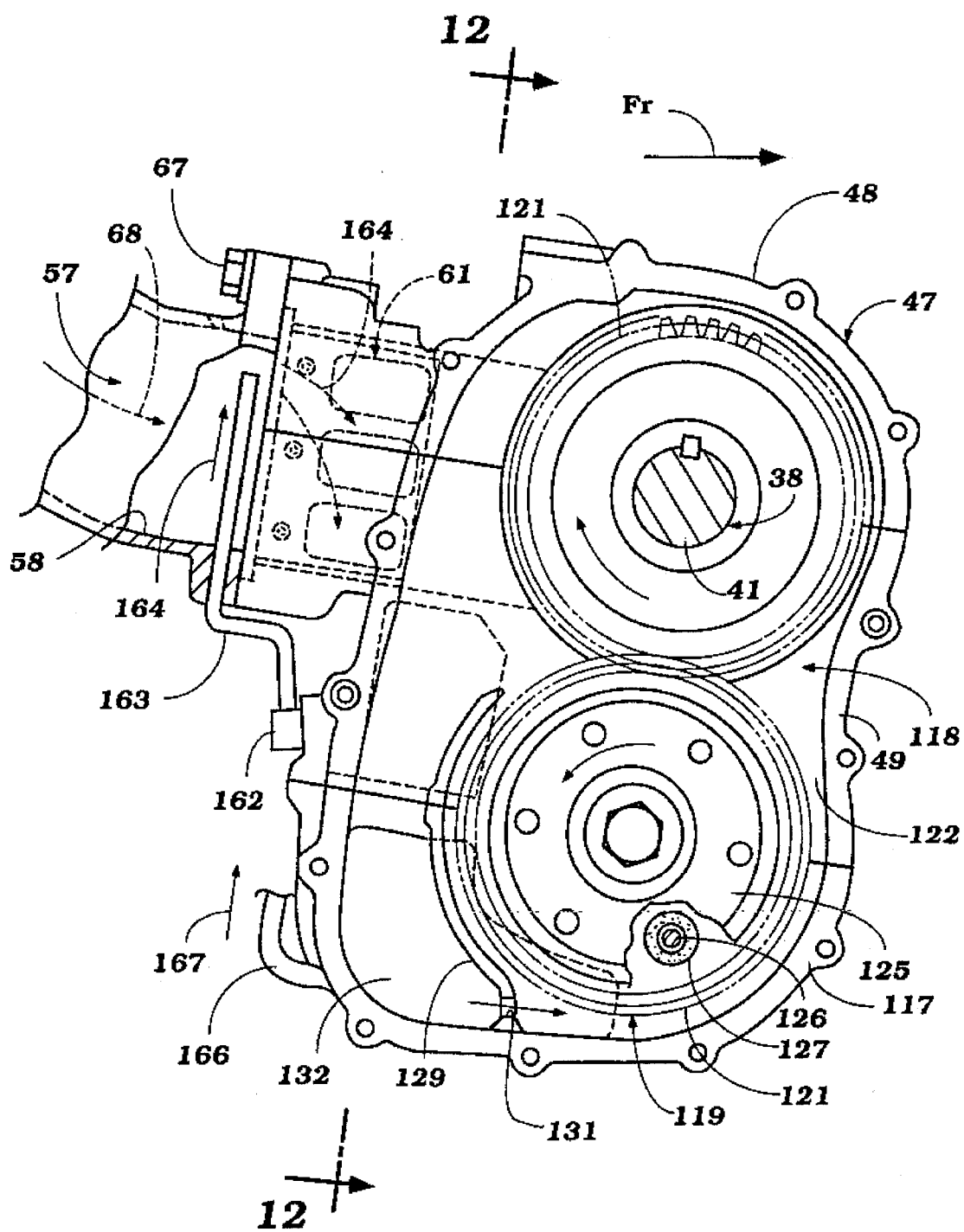
FIG. 11 is a cross-sectional view taken along the line 11—11 of FIG. 10 and shows the driving transmission arrangement for the balancer shaft with portions broken away.

As may be best seen in FIGS. 10 and 11, the gear 119 is affixed to the balancer shaft 114 by means of a flexible coupling so as to provide some torsional damping. Thus, the gear 119 includes an outer ring segment 124 that is connected to a hub portion 125 by means of a plurality of pins 126 and surrounding elastic dampers 127.

On the opposite side of the front bearing 115, the compartment 116 is sealed by means of an oil seal 128 for a reason which will become apparent.

The transmission cavity 121 is provided with an internal wall 129 (FIG. 11) in which a restricted opening 131 is provided. This forms a second cavity 132 to one side of the transmission 118. The right hand side of the wall 129 can be filled with lubricant to a level that will approach or even be higher than the axis of rotation of the balancer shaft 114 when the engine is not running. However, due to the rotation of the gear 119 as shown by the arrows in FIG. 11, the gear teeth 124 will pick up the lubricant and throw it over the wall 129 into the cavity portion 132 where it will accumulate when the engine is running. Thus, adequate lubrication for the transmission 118 is possible but drag is minimized since when the engine is running the lubricant will seep slowly back into the transmission cavity 122 through the restricted opening 131 and only the lower tips of the teeth of the gear 119 will be emersed.

The engine 31 is liquid cooled and thus both the cylinder block 32 and cylinder head 93 are provided with respective cooling jackets 133 and 134, respectively, which cooling jackets appear in FIGS. 2, 3, 4, 6, 7 and 8. Coolant is circulated through this cooling jacket in a manner which will be described when the vehicle is described by reference to FIGS. 13–19.

The Lubricating System

The lubricating system for the engine 31 will now be described in detail initially by reference to FIG. 1, wherein many of the components of the lubricating system are shown schematically. The lubricating system includes a direct cylinder lubricating system, indicated generally by the reference numeral 135, for lubricating the cylinder wall 33 and sliding surfaces of the pistons 34. A further lubricating system 136 is provided for directly lubricating the crankshaft bearings 41 and the main bearings 42, 43, 44 and 45 thereof. Finally, there is provided a lubricating system 137 which delivers lubricant to the engine for indirect lubrication through the induction system.

As will become apparent, each of these lubricating systems 135, 136 and 137 is separately controlled and has portions so that the components of each cylinder can be controlled separately from each other. In this way, it will be ensured that each portion of the engine will be adequately lubricated but that excess lubricant need not be supplied since the amount of lubricant supplied to the individual components of the engine and the individual components associated with each cylinder separately and independently.

Still referring primarily to FIG. 1, the lubricating system 135 includes a lubricant reservoir 138 common for all of the systems 135, 126 and 137 and from which a first series of lubricant pumps 139, one for each cylinder, are provided and each of which supplies lubricant to a respective conduit 141 that terminates in the cylinder wall of the cylinder bores 33 in an area swept by the skirts of the pistons 34, as will be described. A first pressure gage 142 is positioned in at least one of the lines 141 for providing an indication of the pressure of the lubricant being supplied.

The lubricant pumps 139 are driven independently of each other at either a duty cycle or rate of speed as controlled by an ECU 143 which outputs control signals to the lubricant pumps of the system 135 through control lines indicated schematically at 144 in this figure. The ECU 143 receives signals from the engine indicative of its operation so that the desired amount of lubricant, as will be described, can be supplied. These signals generally may include an engine speed signal determined by a speed sensor and load signal, as determined by a throttle position sensor or other mechanism.

The crankshaft bearing lubricating system 136 includes a plurality of pumps (one for each cylinder) 145 which also draw lubricant from the common reservoir 138 and delivers it to the center main bearings 42 and 43 and rear main bearing 45 through conduits 146. Like the pumps 139 for the cylinder lubrication, the pumps 145 receive individual control signals from the ECU 143 via conductors indicated schematically at 147. Again, a pressure gage 148 may be positioned in one of the conduits 146 for providing an indication of pressure output. The amount of lubricants supplied by the pumps 145 is varied by the ECU 143 by using maps for each cylinder indicative of the required lubricant supply amount as determined experimentally and in response to engine running conditions, for example aforenoted.

It should be noted that the running conditions employed for controlling the lubricating systems 135, 136 and 137 need not be all the same but in a preferred embodiment they are. Finally, the indirect lubricating system 137 includes a plurality of pumps, one for each cylinder, shown schematically at 149 which are also controlled by the ECU 143 and draw lubricant from the common reservoir 138. Lubricant is supplied to the intake manifold 57 from the pumps 149 through respective conduits 151 and a pressure gage 152 may be positioned in one of these conduits.

The actual engine structure that completes the lubricant supply systems 135, 136 and 137 now will be described by reference to the remaining figures. Turning first to the direct cylinder lubricating system 135, this system is illustrated in the engine in FIG. 2 wherein it will be seen that the cylinder block 32 is formed with a number of drilled passages 153 that communicate with the conduits shown schematically at 141 in FIG. 1 and which are cross drilled as at 154 so as to deliver lubricant directly to the cylinder bore 33 in an area swept by the skirts of the pistons 34. There may be provided a plurality of circumferentially spaced drilling for ensuring adequate lubricant to all sides of the skirts of the pistons 34.

The system 136 for lubricating the crankshaft 38 will now be described by particular reference to FIGS. 2 and 10 in addition to FIG. 1. The lower portion of the cylinder block 32 is provided with a further series of cross drilling 155 adjacent each of the main bearings 42, 43 and 45. Radially extending drilling intersect these cross drilling and deliver the lubricant directly to these main bearings. The drillings 155 communicate with the conduits 146 shown schematically in FIG. 1.

In addition, the sides or throws 51 of the crankshaft 39 have cross drilling 156 which begin from adjacent from the respective bearings 42, 43 and 52 and pick up the lubricant which has lubricated these bearings. The cross drilling 156 are angularly disposed and are closed at their outer ends by plugs 157. The throw bearing portions 38 are provided with cross drilling 158 so that lubricant will flow by centrifugal force to lubricate the throws and big ends of the connecting rods 36.

It should be noted that the front main bearing 44 and the bearing 155 for the balancer shaft 114 will be lubricated by splash of the lubricant contained within the cavity 122. Therefore, no separate lubricating system is required for these two bearings.

The indirect lubricating system 137 for the remaining components of the engine 31 will now be described by primary reference to FIGS. 1 and 3. As has been noted, the lubricant from this lubricating system 137 is delivered to the induction system and particularly to the intake manifold 57. For that purpose, each runner 58 is provided with a drilled passageway 159 that is disposed on the upper side of the runners 58 and which is in communication with the conduits 151. These passageways 159 are disposed downstream of the throttle valve 56 but upstream of their respective reed valves 61. By introducing this lubricant upstream of the reed valve 61, the lubricant will somewhat dampen the sounds created by the reed valve 65 and will thus provide for a smoother running engine as well as lubricating the components of the engine not directly lubricated. This includes primarily the piston pins 35.

It should be noted that some lubricant may collect in the crankcase chambers 46. This lubricant is drained by means of a passageway 161 formed in the crankcase member 49 at a lower portion thereof. A fitting 162 is connected to each passageway 161 and includes a tube 163 that extends into each intake manifold runner 58 upstream of the reed valve assembly 61 and also at a point at the top of this runner. Because of the running of the engine, there will be a reduced pressure existent in the end of the tube 163 and this will tend to draw lubricant from the crankcase chambers 46. If desired, the fitting 162 may also include a check valve so that lubricant can flow only from the crankcase chambers 46 to the manifold runners 58. The direction of this flow of lubricant is indicated by the arrows 164 (FIG. 1).

Figure 12:
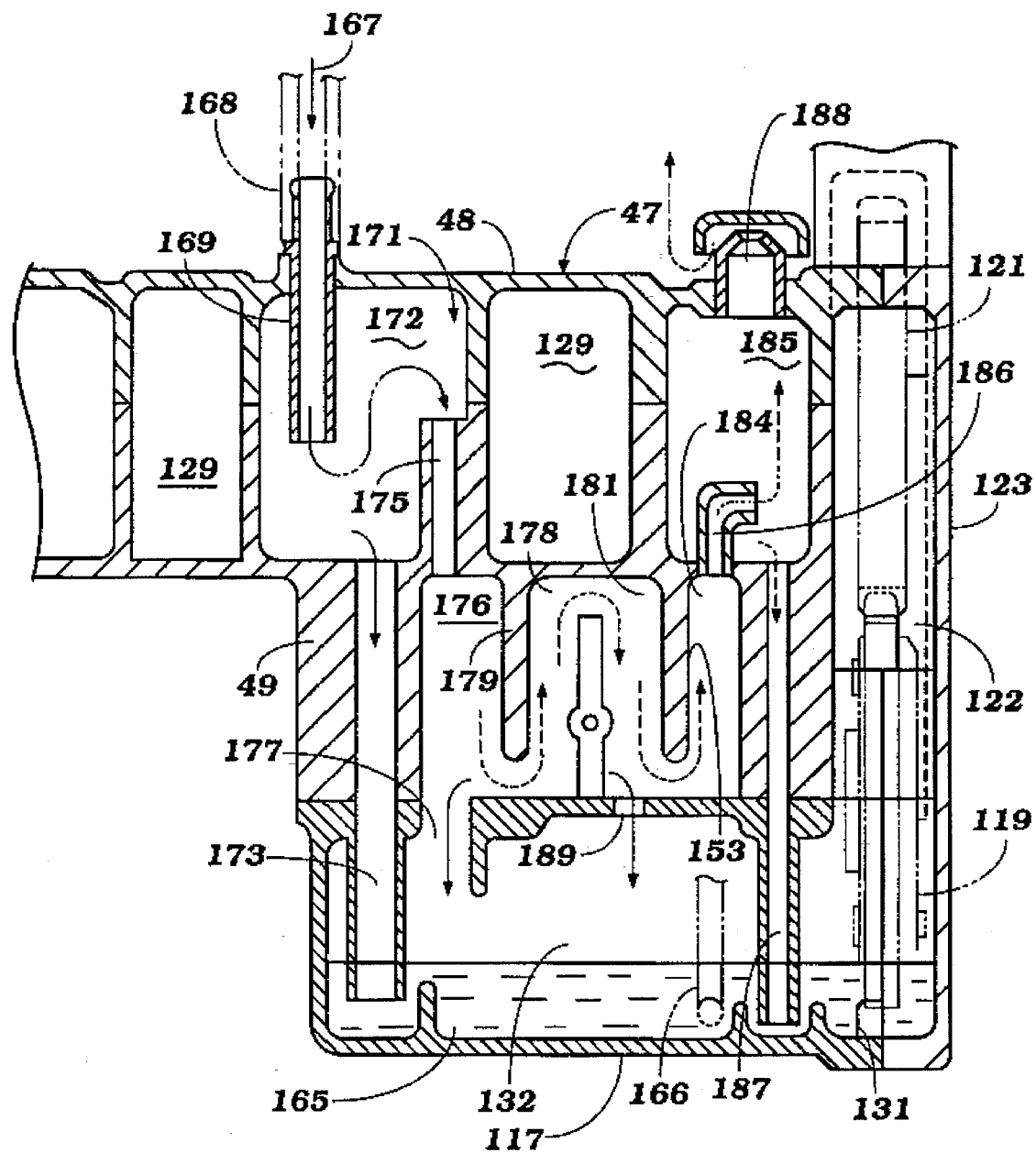
FIG. 12 is a cross-sectional view taken along the line 12—12 of FIG. 11 and shows the oil separating arrangement for the vacuum pump lubrication system.

Referring now primarily to FIG. 12, the lubricant in the transmission cavity 122 and specifically that contained to the side of the wall 129 indicated by the reference numeral 132 actually extends back along a side of the crankcase 47 beneath the forwardmost intake passage 59 so as to contain an adequate volume of lubricant. This lubricant is utilized also to lubricate a vacuum pump for operating certain accessories of the vehicle (to be described later by reference to FIGS. 13–20) and to separate the lubricant from the air which is then discharged to the atmosphere by this vacuum pump.

Oil is supplied from the chamber 132, the lubricant being indicated by the level line 165, through a delivery conduit 166 in the direction of the arrow 167 in FIG. 11. After being circulated this lubricant will become mixed with the air pumped by the vacuum pump and will be returned as shown by the arrow 167 in FIG. 12 through a conduit shown in phantom in this Figure and indicated by the reference numeral 168. This conduit 168 slips over an inlet tube 169 which discharges into the oil separator, indicated generally by the reference numeral 171 and specifically a first chamber 172 thereof which is formed in the side of the crankcase portion 48. A first passageway 173 will accept oil condensing in the chamber 172 and return it to the chamber 132 below the lubricant level 165.

An air passage 175 extends from the chamber 172 above the lubricant passage 173 to a further chamber 176 formed below the chamber 172 and which communicates with the lubricant chamber 132 through a large drain passageway 177. A further chamber 178 is separated from the chamber 176 by a partial wall 179 so as to provide a labyrinth type air flow through the separator 171 and into a further chamber 181 which is separated from the chamber 178 by another partial wall 182. A yet further wall 183, which is also a partial wall, provides restrictive communication between the chamber 181 and a further expansion chamber 184. The chamber 184 communicates with a chamber 185 formed in the side of the crankcase 48 through a short angled tube 186. The chamber 185 has a further drain passage 187 formed below the pipe 186 and which will also return lubricant to the chamber 132 below the level 165 therein. The chamber 185 then discharges the air pumped by the vacuum pump and which has had substantially all of the lubricant separated from it by the separator 171 to the atmosphere through a baffled discharged 188.

The chambers 178, 181 and 184 can drain back to the chamber 132 through a further drain passage 189.

The Vehicle (FIGS. 13–20)

The engine 31 as thus far described may be utilized for any of a multitude of purposes. However, the engine 31 is particularly adapted by powering a motor vehicle. A motor vehicle of the type which may be powered by the engine 31 is depicted in phantom in portions of FIGS. 13–20 and is identified generally by the reference numeral 191. The vehicle 191 is provided with a frame and body assembly 192 having a pair of front wheels 193 suspended therefrom by a suitable suspension system and which front wheels 193 may be steered by any known type of steering mechanism. At the rear end of the vehicle 191, the body frame assembly 192 suspends a pair of rear wheels 194. Again, any suitable type of suspension system may be provided for suspending these rear wheels.

The motor vehicle 191 is of the type that employs a transverse engine placement and drive of the front wheels 193. To this end, the engine 109 is mounted in the frame assembly at the front of the vehicle 191 by engine mounts 195 and 196. The engine 31 is positioned in an engine compartment at the front of the vehicle and which is accessible through a hood 197 (FIG. 14) in a known manner. The transverse positioning of the engine means that its crankshaft 39 rotates about an axis disposed transversely to the longitudinal center line of the vehicle 191.

Figure 2:
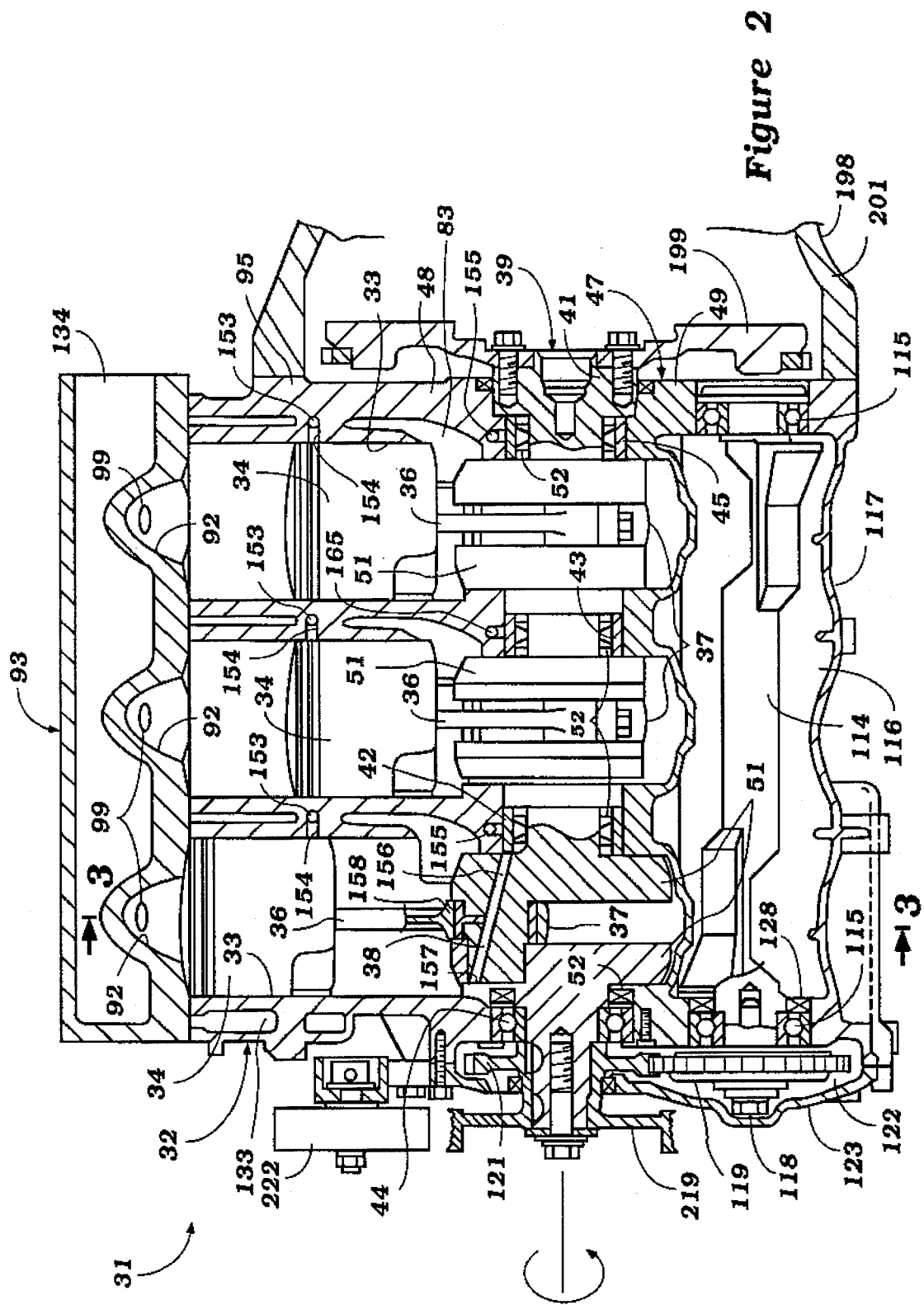
FIG. 2 is a longitudinal cross-sectional view taken through the engine and the portions thereof shown schematically in FIG. 1.

A transmission 198 is coupled to the engine crankshaft 39 and is driven thereby through a clutch which is associated with a flywheel 199 (FIG. 2) positioned at one end of the transmission housing, indicated by the reference numeral 201 in FIG. 2. This transmission drives the front wheels 193 through any known type of transfer drive and differential assembly.

As has been noted, the induction system for the engine which was described previously draws air from within the engine compartment. This air induction system includes a plenum chamber 201 that is connected to the conduit 54 that extends to the throttle body 55 and which may include an air filter of any type. The plenum chamber receives ram inlet air from an inlet tube 202 that extends forwardly toward the grill opening at the front of the vehicle body 192.

Figure 14:
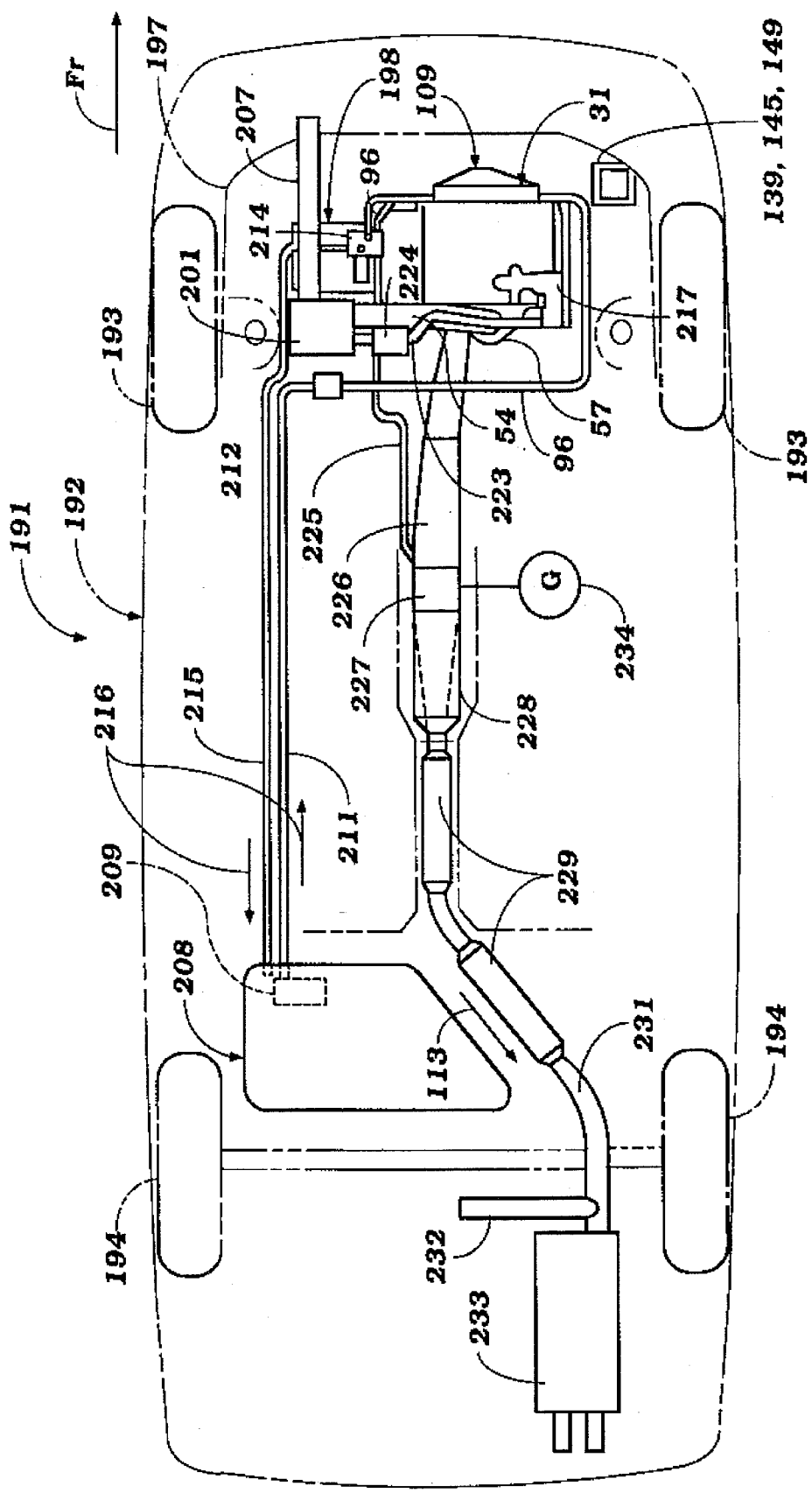
FIG. 14 is a bottom plan view of the installation shown in FIG. 13, with the motor vehicle also shown in phantom.
Figure 15:
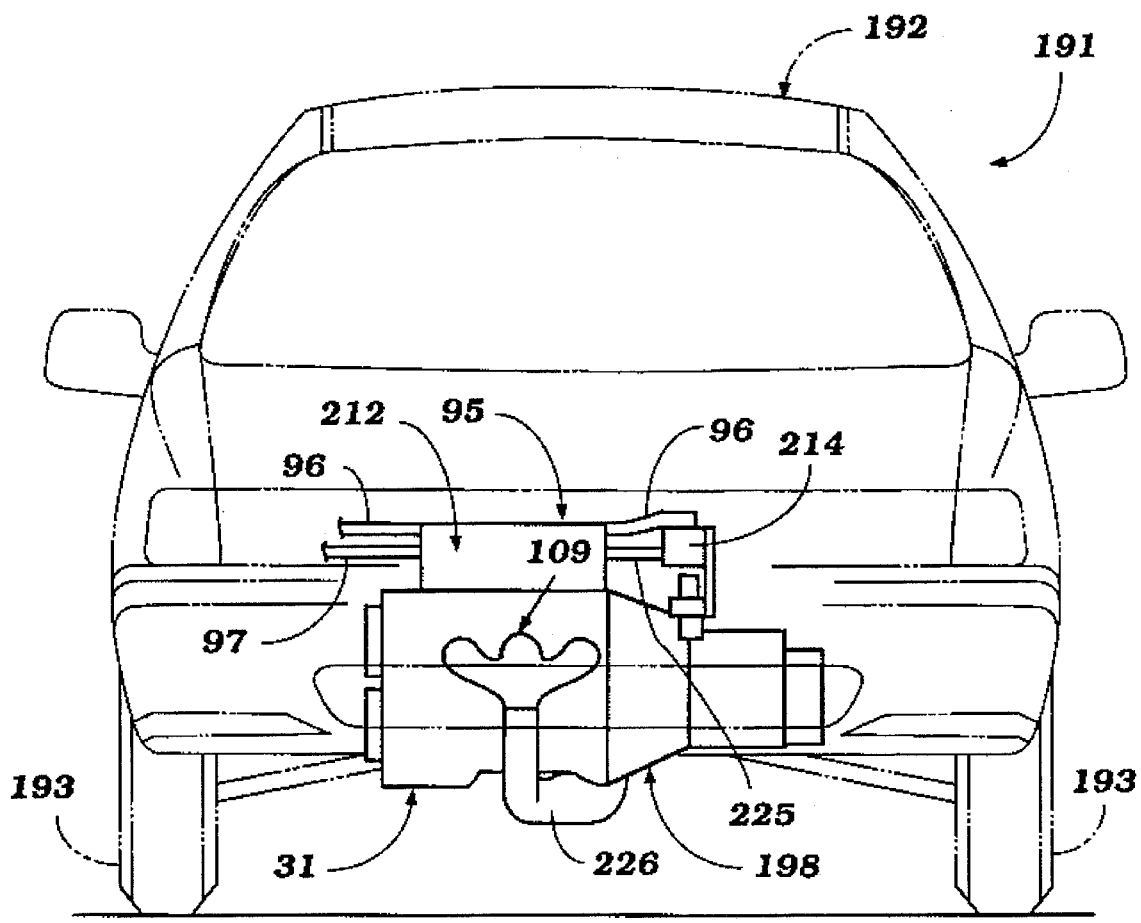
FIG. 15 is a front elevational view of the vehicle and engine, again showing the vehicle in phantom.
Figure 16:
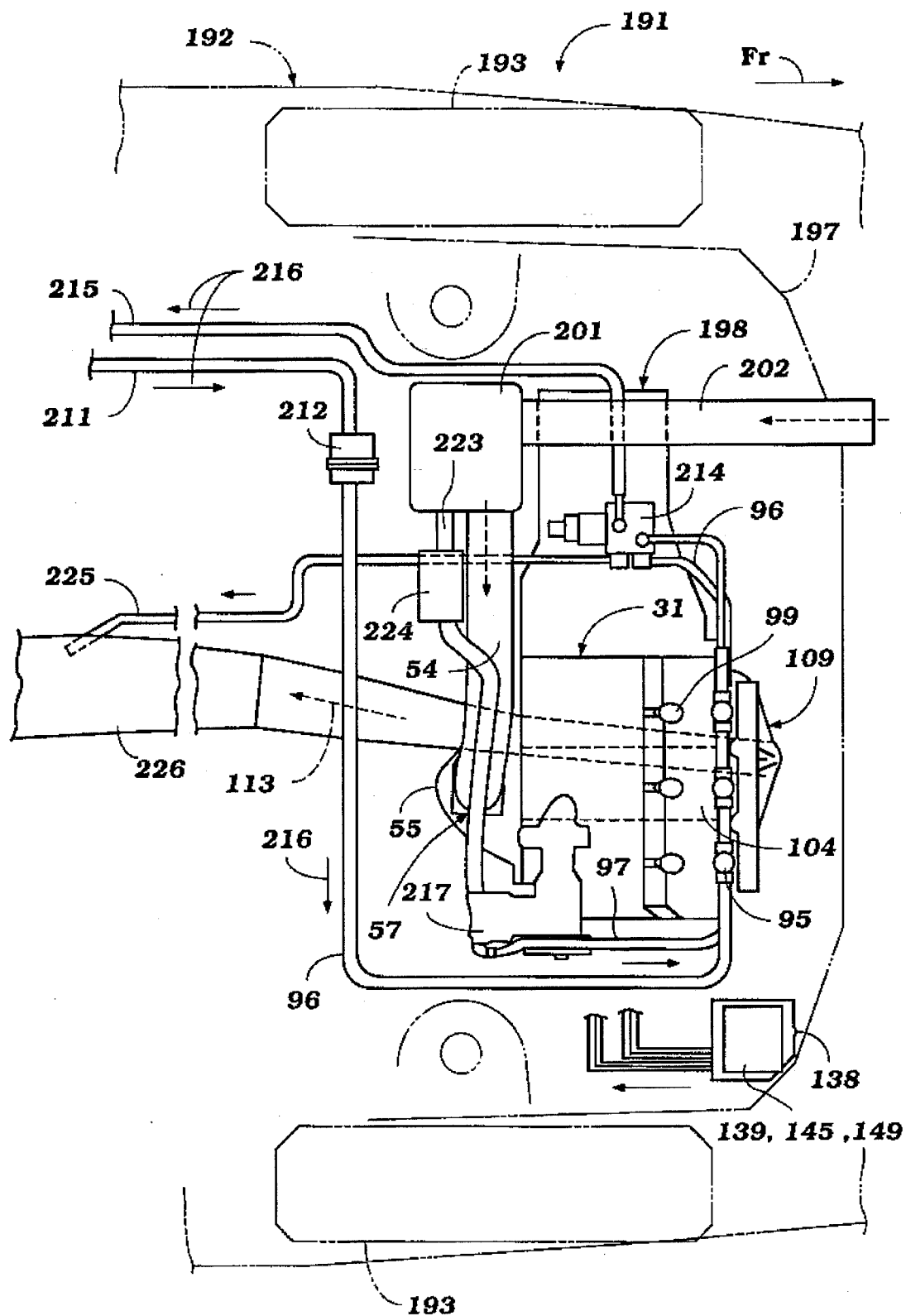
FIG. 16 is an enlarged top plan view of the forward portion of the vehicle, again showing the vehicle in phantom and the engine and its axillaries in solid lines.

It has been noted that the fuel injectors 95 inject fuel into the combustion chambers of the engine and the system for supplying fuel to the fuel injectors 95 will be described by primary reference to FIGS. 14–16. The vehicle body 192 is provided with a rearwardly positioned fuel tank 208 having an in-the-tank fuel pump 209 that delivers fuel through a conduit 211 to a fuel filter 212. The fuel filter 212 then delivers fuel to the aforenoted fuel conduit 96 which forms a portion of the fuel/air injection system and which includes a common fuel/air manifold and distributor rail, indicated generally by the reference numeral 212 that is connected in a known manner to the fuel/air injectors 95. This conduit 96 also communicates with a pressure regulator 214 that regulates the pressure at which the fuel is supplied to the fuel/air injectors by dumping excess fuel back to the fuel tank 208 through a return conduit 215. The direction of fuel flow through the system is identified by the arrows 216 in these figures.

The air supply system for supplying pressurized air to the air/fuel injectors 95 and specifically to the manifold 212 will now be described by particular reference to FIGS. 14, 16 and 17. As has been noted in the description of the engine, this includes an air supply conduit 97 that receives compressed air from an air compressor 217 that is mounted at the end of the engine opposite the transmission 198 and which is driven from the engine crankshaft by a serpentine drive belt 218. The crankshaft has a pulley 219 that is affixed to it in a known manner and which drives the drive belt 218. This drive belt 218 passes over a belt tensioner 222 and drives additional accessories as will be noted. The air compressor 217 draws the air from the plenum chamber 201 through a conduit 223 that includes a silencing chamber 224.

The air/fuel manifold 212 and specifically the air conduit 96 also communicates with the pressure regulator 214 that maintains a predetermined pressure differential between the regulated fuel pressure and the regulated air pressure (the fuel pressure being higher). The air pressure is regulated by dumping excess air from the regulator 214 into the exhaust system, to be described, through a conduit 225.

Figure 13:
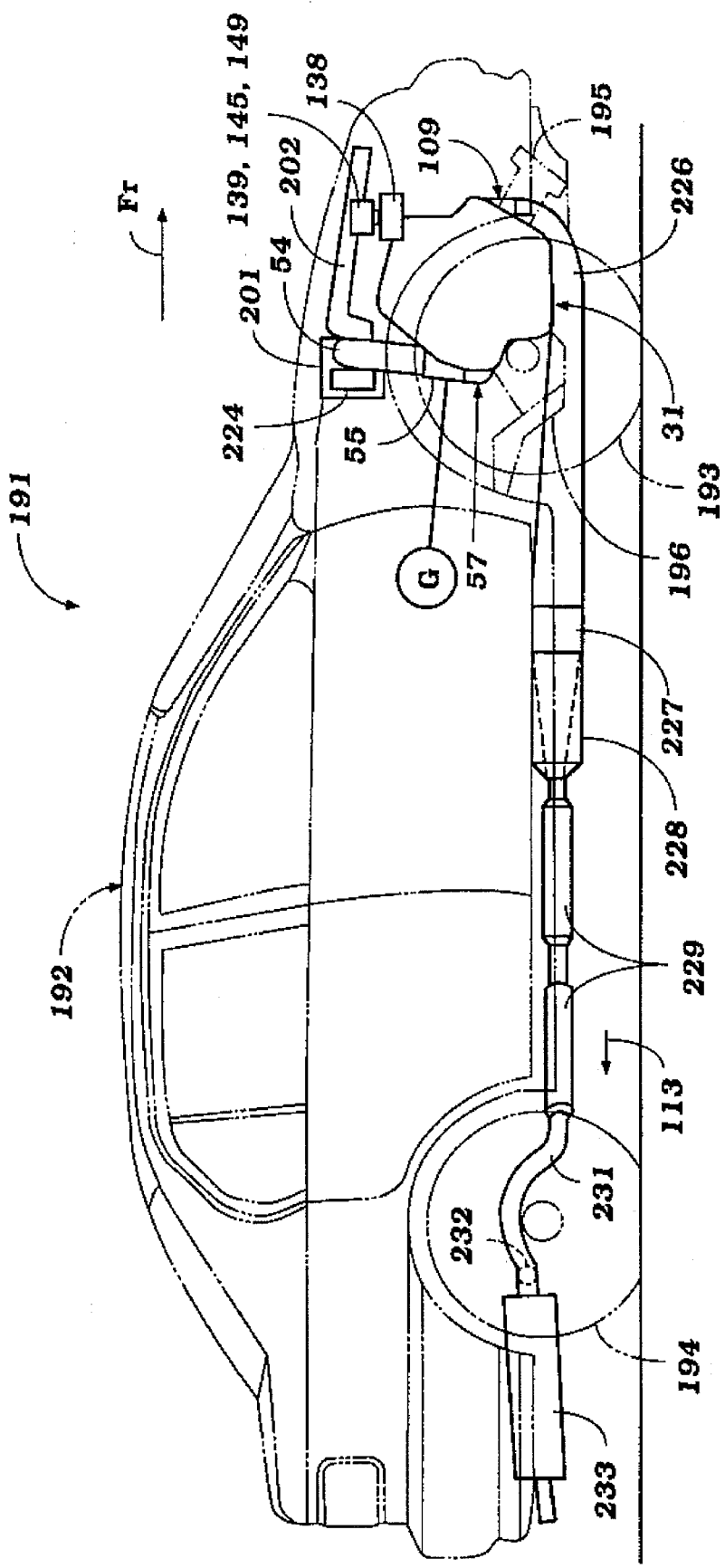
FIG. 13 is a side elevational view of the engine of FIG. 1–12 and its supporting axillaries as installed in a motor vehicle, which vehicle is shown in phantom.

The remainder of the exhaust system for the engine 31 will now be described by reference to FIGS. 13 and 14. This exhaust system, as previously noted, included the exhaust manifold 109. The exhaust manifold discharges into an exhaust pipe 226 which extends from the front of the engine 31 and runs beneath it to a catalytic converter 227. The catalytic converter 227 is formed as the forward portion of a first muffler 228. The first muffler 228 discharges to a pair of mufflers 229 which, in turn, discharge to a tail pipe 231. A branch pipe 232 intersects the tail pipe 231 where the tail pipe 231 discharges into a final muffler 233 that then delivers the exhaust gases to the atmosphere.

A temperature probe extends in to the catalyst 228 and provides a signal to a gage 234 that is positioned in the operator's compartment of the vehicle.

As has been noted, the engine 31 is liquid cooled and the cooling jackets 133 and 134 for the engine were described in the portion of this specification dealing with the engine. However, it was noted that the manner in which the coolant was circulated through the engine would be described and that description will now be made by particular reference to FIGS. 18–20. The engine is provided with a combined water pump, thermostat assembly 235 which is driven by the engine in an known manner and which circulates coolant through a discharge line 236 to a heat exchanger or radiator 237. The coolant then returns to the water pump, thermostat assembly 235 through a return line 238. Coolant is delivered to the engine through a coolant supply line 239 and into the engine block through a fitting 241 with the direction of the coolant flow to the engine being identified by the reference numeral 242.

Figure 17:
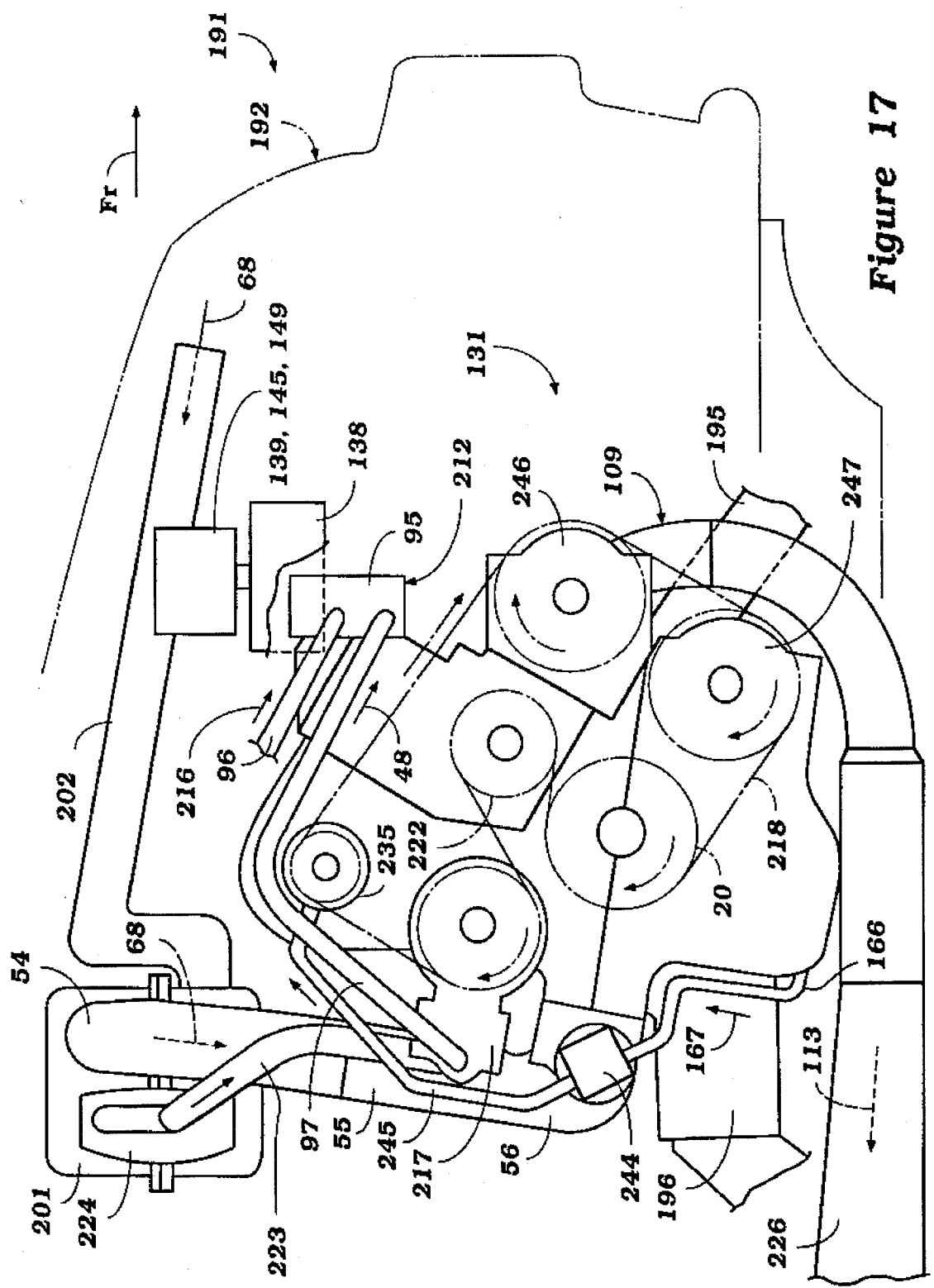
FIG. 17 is an enlarged side view of the front of the vehicle looking in the same direction as FIG. 13.
Figure 18:
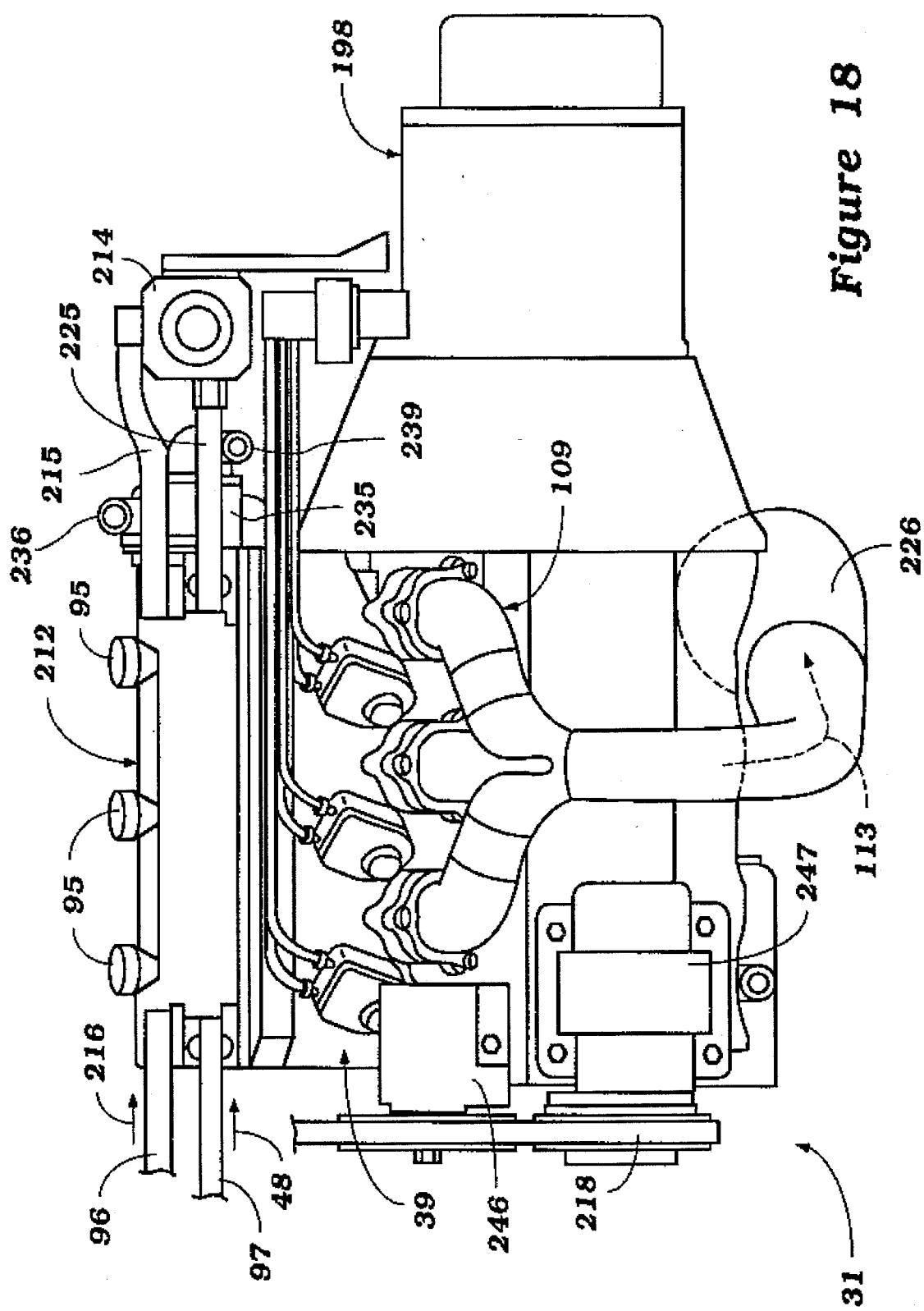
FIG. 18 is an enlarged front elevational view of the engine and the accessories which are visible from the front of the vehicle.
Figure 19:
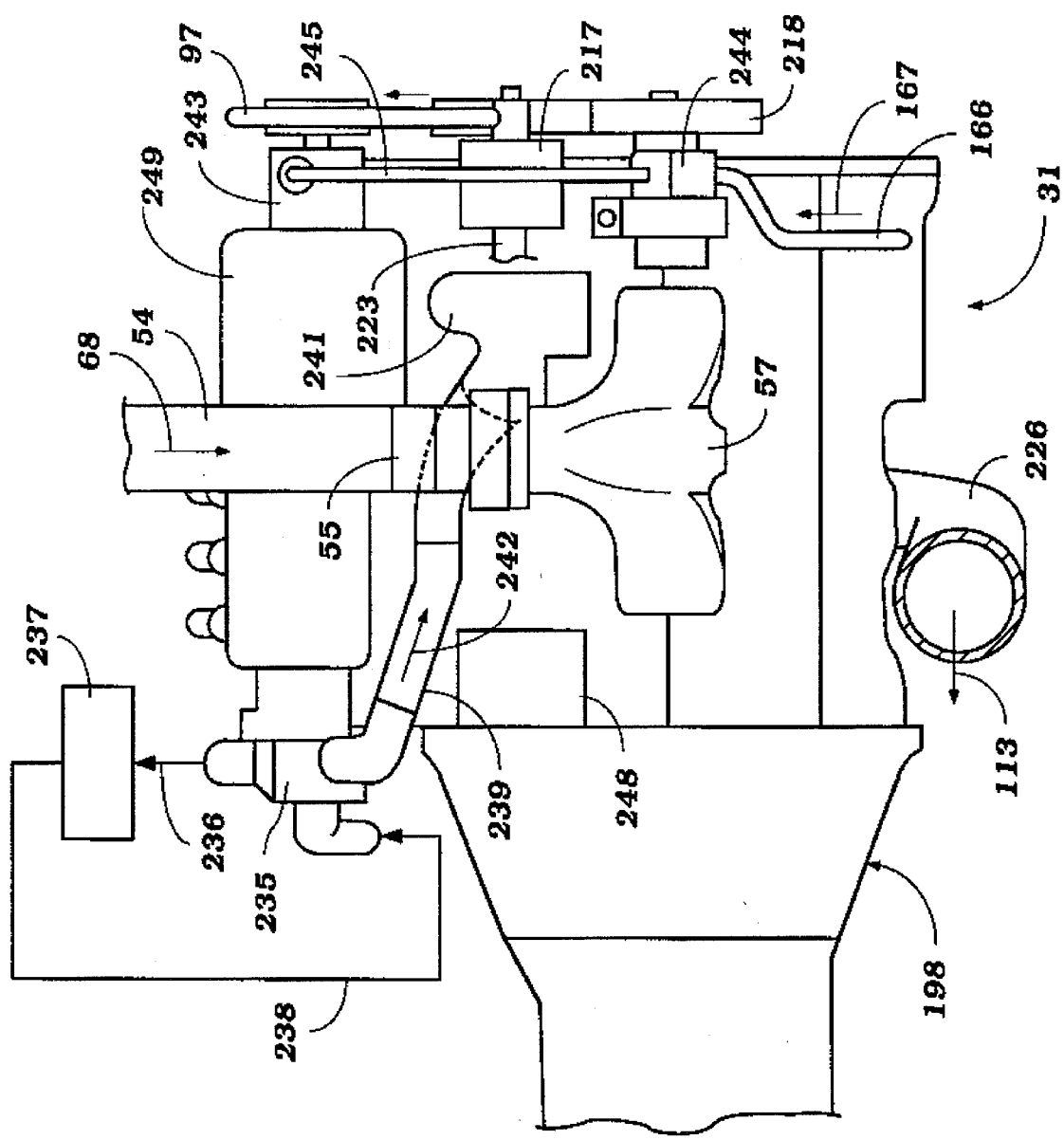
FIG. 19 is a rear elevational view of the engine and its supporting accessories.
Figure 20:
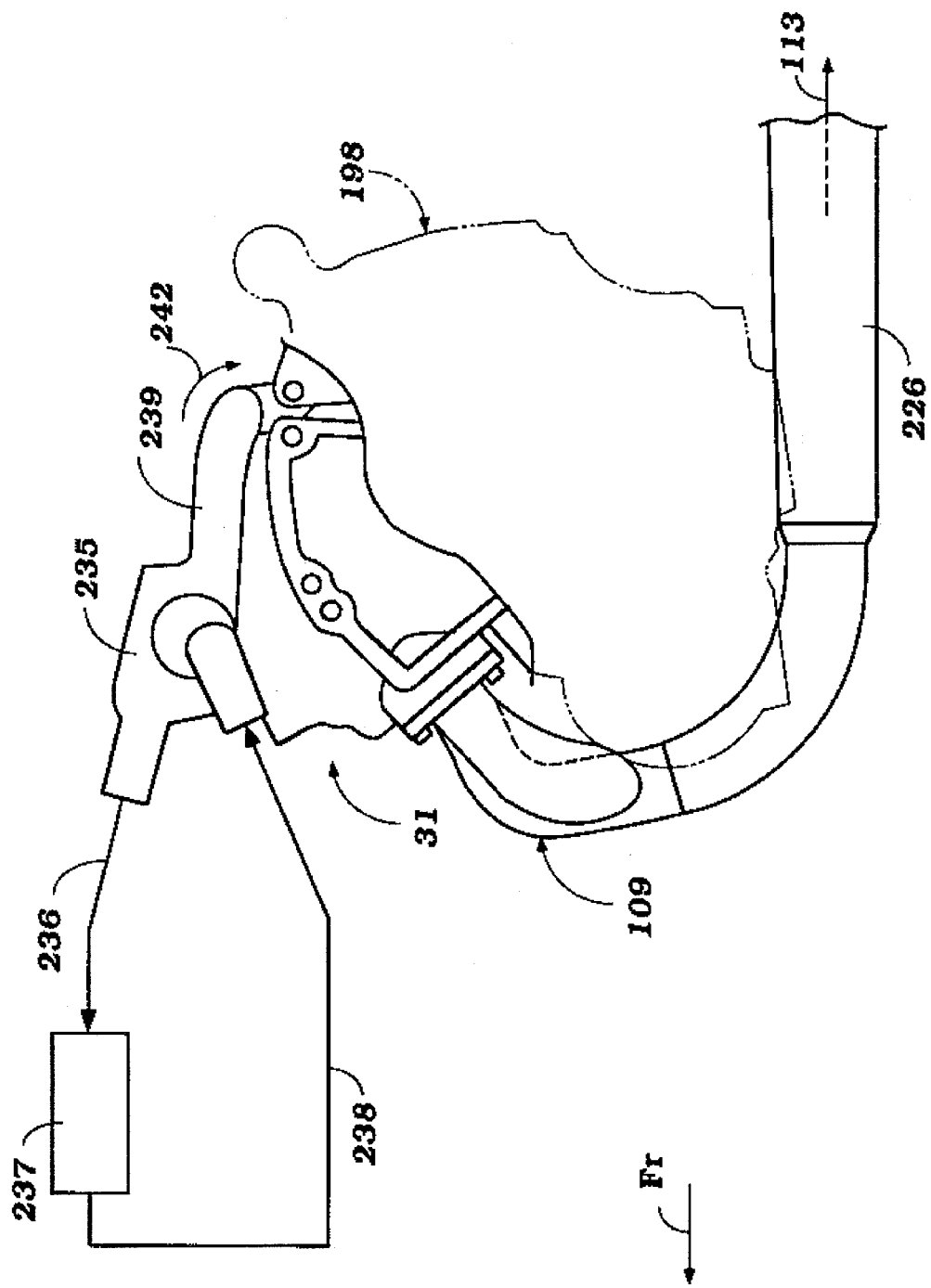
FIG. 20 is a side elevational view of the engine with certain components being broken away and other components being shown schematically and looking in the direction opposite to FIG. 17.

As has been previously noted, a vacuum pump is driven from the engine and this vacuum pump and the components associated with it may be best understood by reference to FIGS. 17 and 19. The vacuum pump is indicated generally by the reference numeral 235 and is driven by the drive belt 218. The vacuum 243 is generated to provide a source of vacuum for the power braking system of the vehicle inasmuch as the engine 31 does not itself provide adequate induction system vacuum for the brake booster. The air is drawn from the brake booster by the vacuum pump 243 and is discharged to the atmosphere through the oil separator 171 previously described in conjunction with the description of the engine and illustrated in FIG. 12.

As has been noted, the vacuum pump 243 is lubricated from the lubricant in the sump 165 of the transmission 118. As has been previously noted, this lubricant is drawn through the conduit 166 and is drawn by an oil pump 244 which is driven from the engine through a suitable belt or other drive (not shown). The oil pump 244 then delivers the oil to the vacuum pump 243 through a pressure line 245.

The air which is pumped from the brake booster by the vacuum pump 243 is returned through the aforenoted conduit 168 (FIG. 12) to the oil separator 171 as previously described and then discharged to the atmosphere through the outlet 188.

Two remaining accessories are driven from the drive belt 218 and these appear in certain of these figures and are provided for operating other components of the vehicle. These components appear also in FIG. 17 and comprise a power steering pump 246 and an air conditioning compressor 247.

The vehicle and specifically the engine 31 is also provided with an electric starter 248 (FIG. 19) of any type which cooperates with the flywheel 199 in a known manner for engine starting.

Finally, the electrical system also includes a alternator or generator 249 that is driven off the rear of the vacuum pump 243 from the drive belt 218 for charging the battery of the vehicle and providing other electrical power.

Figure 21:
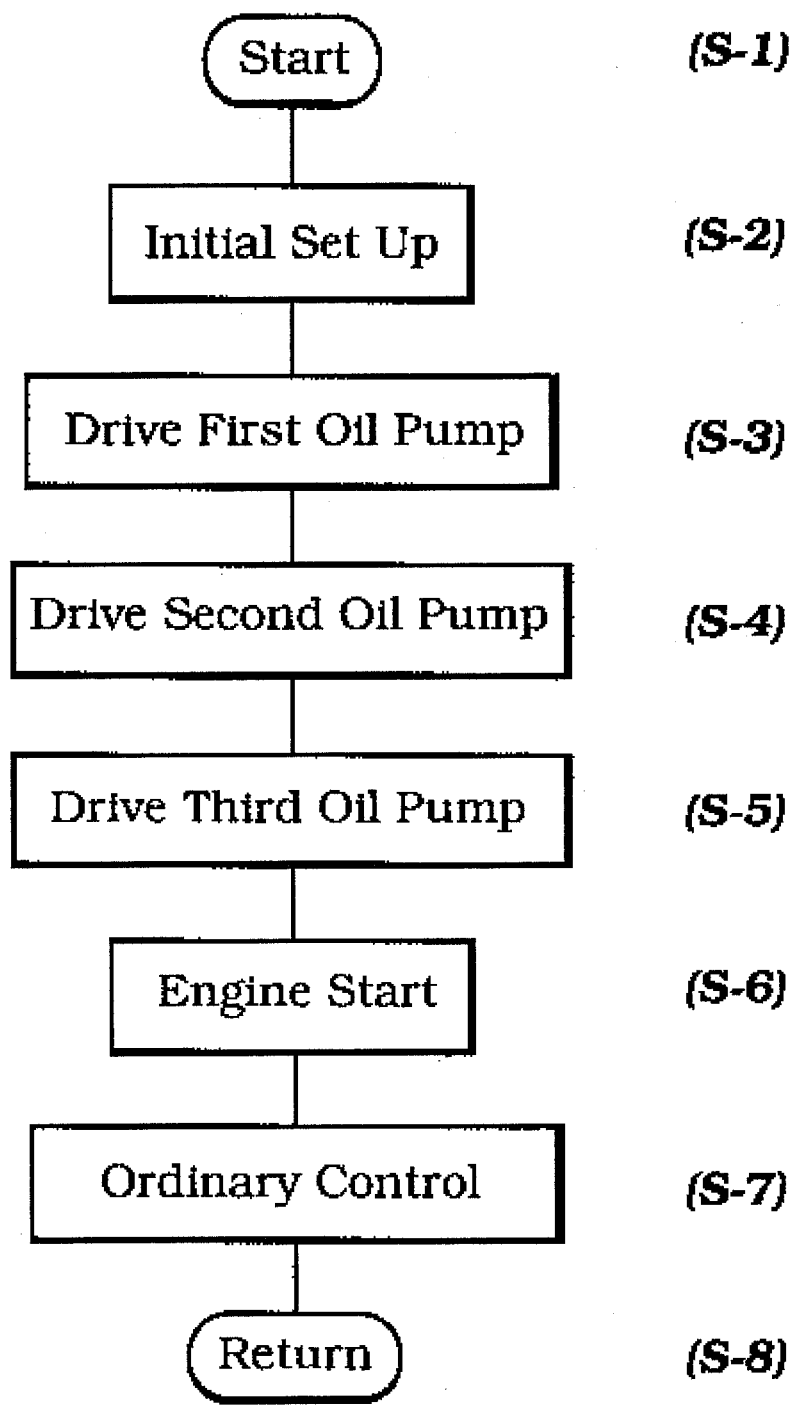
FIG. 21 is a block diagram showing the control routine for operation of the lubrication system.
Figure 22:
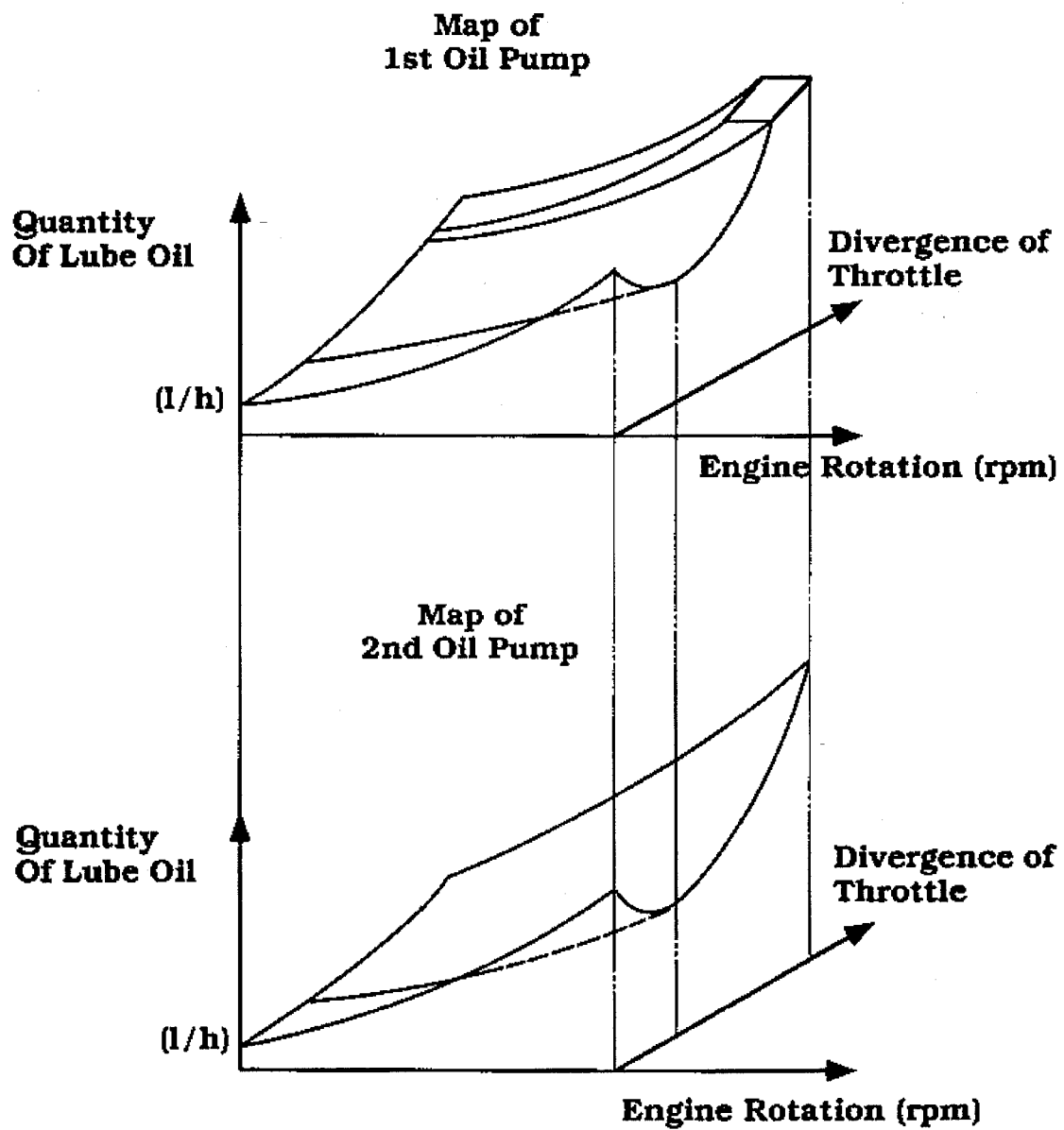
FIG. 22 is a graphical view showing the three-dimensional maps of the lubricant supply of the oil pumps.

Lubricant Control System (FIGS. 21 and 22)

As has been noted, the control of the lubricant for the systems 135, 136 and 137 may be of any type that controls the amount of lubricant delivered by the pumps 139, 145 and 149 in response to sense engine parameters. However, a portion of the control routine is shown in FIG. 21 and this shows the control routine for operating the pumps 139, 145 and 149 before the engine has started and then returning to normal control of the lubricant amount once the engine has started.

Referring to this figure, at the first step S-1 the program starts and moves to the step S-2 to determine the turning on of the main switch for operating the engine 31.

The program then moves to the step S-3 so as to start driving the first series of oil pumps 139 that deliver lubricant to the cylinder walls 33 and piston skirts 34 so as to insure that these sensitive surfaces are lubricated before the engine will be cranked.

The program then moves to the step S-4 so as to start the operation of the second series of pumps 145 that lubricant the main bearings 42, 43 and 45 and also the connecting rod journals.

The program then moves to the step S-5 to begin the operation of the remaining oil pumps 149, those which supply lubricant to the induction system.

The program then moves to the steps S-6 wherein engine start is initiated and then to the step S-7 wherein the normal control routine for the operation of the pumps 139, 145 and 149 is begun. As aforenoted, this routine may be of any type known in the art. The program then moves to the step S-8 so as to repeat.

As has been noted, the amount of lubricants supplied depends upon engine running conditions and a map is preprogrammed into the ECU 143 so as to determine the amount of lubricant for certain conditions with typical three-dimensional maps being illustrated in FIG. 22. These three-dimensional maps indicate the output of one of the cylinder bore lubricating oil pumps 139 and one of the crankshaft bearing lubricating oil pumps 145. It is to be understood that a different curve will exist for each cylinder. Also, the indirect lubricating oil pumps 149 may have similar curves. The curves show the amount of lubricant in liters per hour for varying engine speeds and throttle openings or loads.

Figure 23:
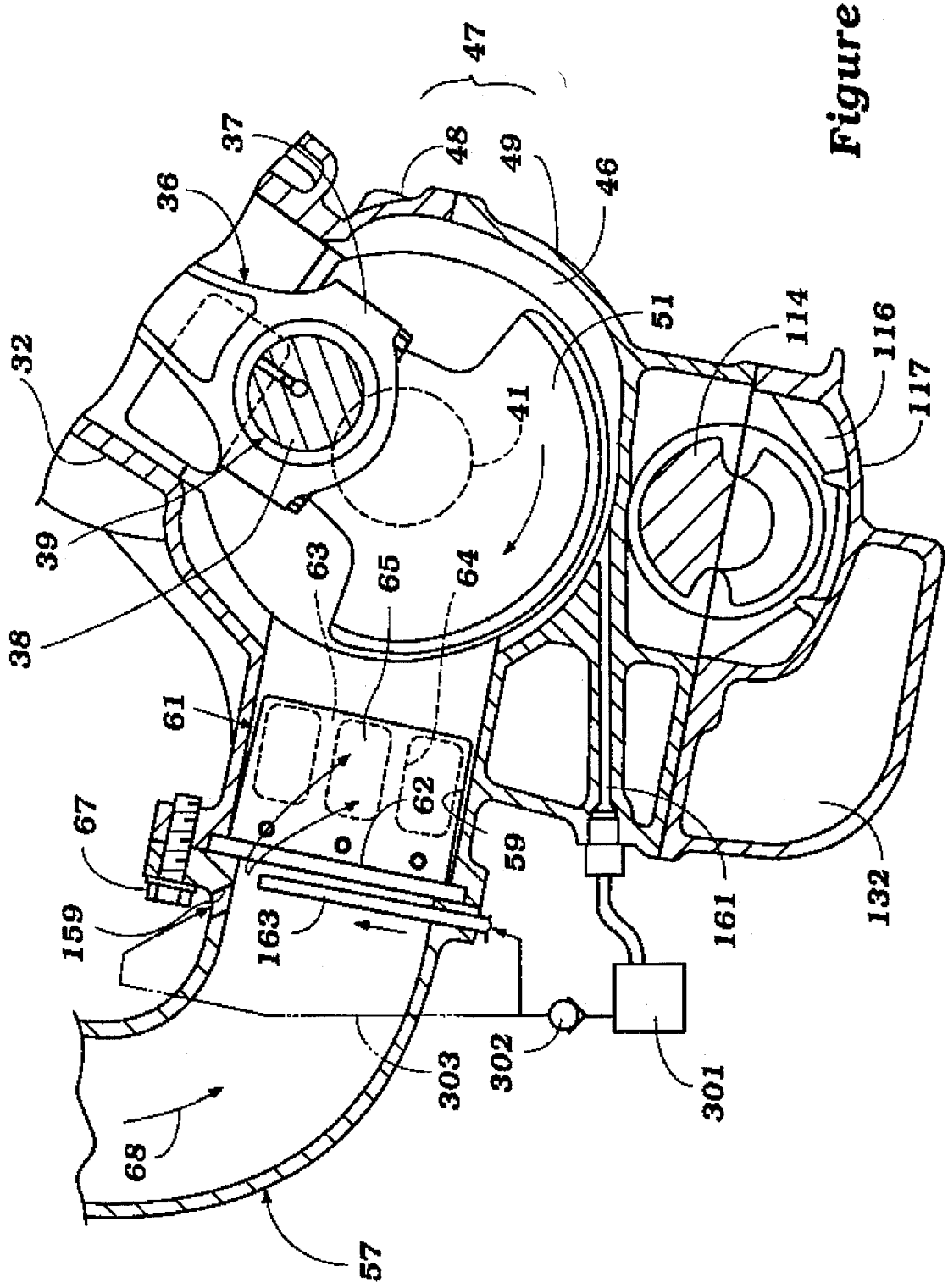
FIG. 23 is a partial view, in part similar to FIG. 3, and shows another embodiment of the invention.

Embodiment of FIG. 23

FIG. 23 illustrates another embodiment of the invention which differs from the embodiment of FIGS. 1–12 only in the way in which the indirect lubrication system for the engine is provided. For that reason, only a partial view of a portion of the engine corresponding to that shown in FIG. 3 is necessary to understand the construction and operation of this embodiment. In addition, in this embodiment components which are the same as those previously described are identified by the same reference numerals.

In this embodiment, the drain passage 161 communicates with a pump 301 which may be driven in any suitable manner and which in addition to discharging to the pipe 163 through a conduit including a check valve 302, supplies a further conduit 303 that extends to the delivery port 159 in the intake manifold 57 adjacent each reed valve 61. The pump 301 may be driven by any suitable control routine.

Figure 24:
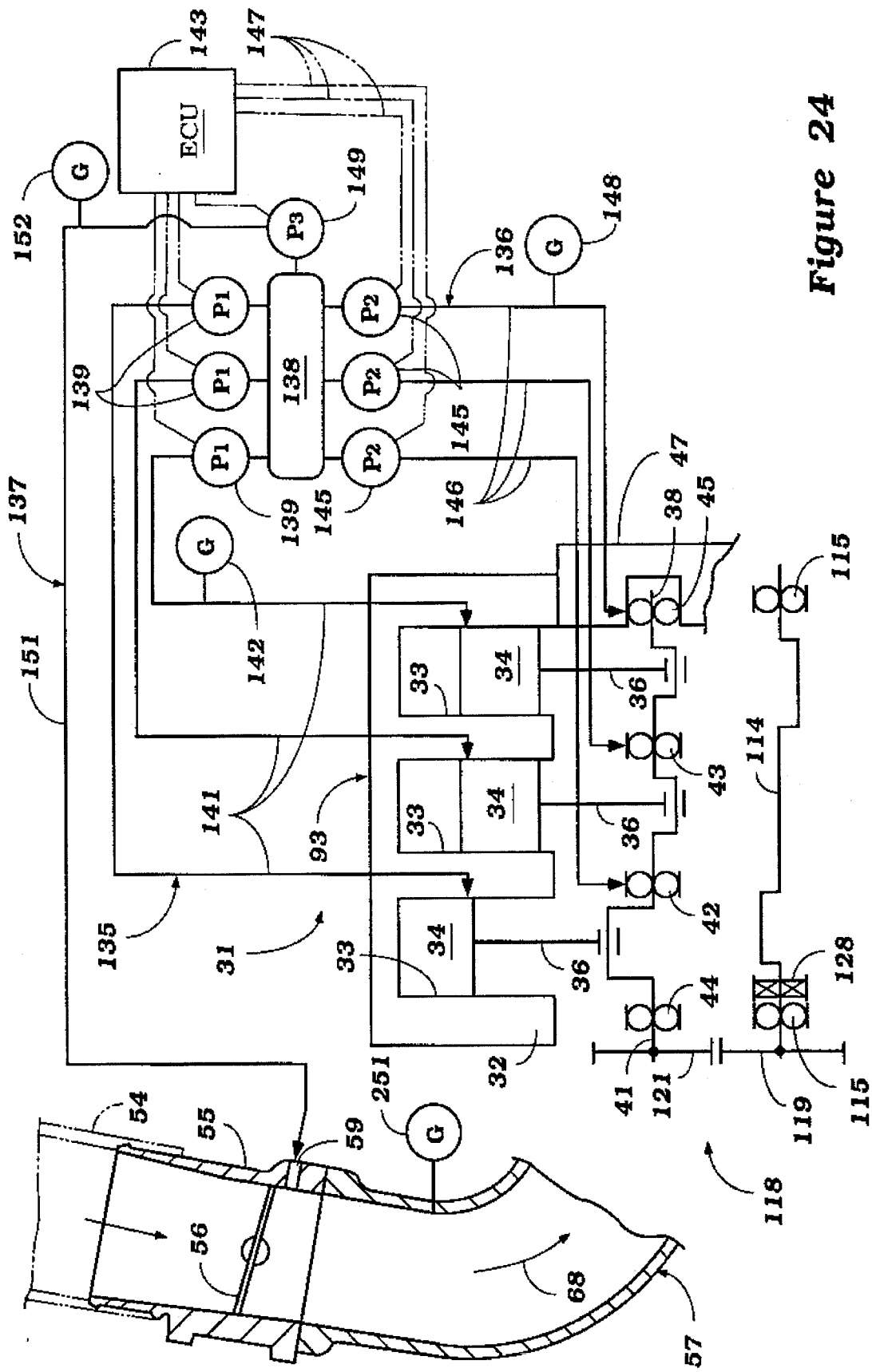
FIG. 24 is a partially schematic view, in part similar to FIG. 1, and shows a still further embodiment of the invention.

Embodiment of FIG. 24

This figure shows another embodiment of the invention that does not employ separate indirect lubricant supply lines for each cylinder. For that reason, a view similar to FIG. 1 is all that is required to depict this embodiment and in this embodiment all components are identified by the same reference numeral where the components are the same as those previously described. In this embodiment, rather than introducing the lubricant from the indirect lubrication system into the runners 58 of the intake manifold 57, the throttle body 55 is provided with a oil delivery port 351 which is disposed immediately downstream of the throttle valve 56 but upstream of the manifold runners 58 and the reed type check valves 61, which are not shown in this embodiment. A single oil pump 149 supplies lubricant to this system through the conduit 151. Because the lubricant is delivered to the common portion of the intake manifold 57, the air flow to the individual cylinders through the runners will ensure distribution of the lubricant to all cylinders for their indirect lubrication.

It should be readily apparent from the foregoing description that the described embodiments of the invention provide lubricating systems for two-cycle crankcase compression internal combustion engines that are extremely effective in controlling the amount of lubricant supplied to the engine and avoiding excess lubricant which could cause emission problems. In all of the embodiments illustrated, the amount of lubricant supplied to the various components is varied by changing the operation of the pump for supplying the lubrication. This may be done by changing the capacity of the output of the pump, varying the duty cycle of which the pump is operated or any other known manner. In addition to this method of providing lubrication control, the lubricant control may also be provided by employing continuously operated pumps that have their output selectively delivered to the engine or dumped back to the reservoir. Any known type of control for the amount of lubricant supply can be utilized in conjunction with the invention. However, the use of separate independently operated pumps does have certain advantages. Of course, the foregoing description is that of preferred embodiments of the invention and various changes in modification may be made without departing from the spirit and scope of the invention, as defined by the appended claims.

I claim:

1. A lubricating system for a two-cycle crankcase compression internal combustion engine comprised of a cylinder, at least one cylinder bore formed by said cylinder, a piston supported for reciprocation within said cylinder bore, a crankshaft rotatably journalled in a crankshaft chamber formed at one end of said cylinder bore and driven by said piston, a cylinder head affixed to said cylinder at the other end of said cylinder bore forming with said piston and said cylinder bore a combustion chamber the volume of which varies upon reciprocation of said piston, an induction system for supplying a charge to said crankcase chamber, a reed type check valve in said induction system for permitting air to flow into said crankcase chamber from said induction system means and precluding reverse flow from said crankcase chamber into said induction system means, a first lubricating system for delivering lubricant directly to said cylinder bore for lubricating the sliding surfaces of said piston and said cylinder bore, a second lubricating system for delivering lubricant to said induction system upstream of said reed type check valve, and means for controlling the amount of lubricant supplied by said first and said second lubricating systems independently of each other in response to engine running conditions.

2. A lubricating system for a two-cycle crankcase compression internal combustion engine as in claim 1, wherein the cylinder forms a plurality of cylinder bores each slidably supporting a piston connected to the crankshaft and wherein the first lubricating system has means for supplying lubricant to each of the cylinder bores and the second lubricating system has means for independently supplying lubricant to the induction systems of each of the cylinder bores.

3. A lubricating system for a two-cycle crankcase compression internal combustion engine as in claim 2, wherein the first and second lubricating systems each have means for independently controlling the amount of lubricant delivered by the respective system to the respective cylinder.

4. A lubricating system for a two-cycle crankcase compression internal combustion engine comprised of a cylinder, at least one cylinder bore formed by said cylinder, a piston supported for reciprocation within said cylinder bore, a crankshaft rotatably journalled in a crankshaft chamber formed at one end of said cylinder bore and driven by said piston, a cylinder head affixed to said cylinder at the other end of said cylinder bore forming with said piston and said cylinder bore a combustion chamber the volume of which varies upon reciprocation of said piston, an induction system for supplying a charge to said crankcase chamber, a reed type check valve in said induction system for permitting air to flow into said crankcase chamber from said induction system means and precluding reverse flow from said crankcase chamber into said induction system means, a first lubricating system for delivering lubricant directly to said cylinder bore for lubricating the sliding surfaces of said piston and said cylinder bore, and a second lubricating system for delivering lubricant to said induction system upstream of said reed type check valve, said first and second lubricating systems each including respective first and second lubricating pumps.

5. A lubricating system for a two-cycle crankcase compression internal combustion engine as in claim 4, wherein the delivery of lubricant by the first and second lubricating pumps are controlled independently of each other.

6. A lubricating system for a two-cycle crankcase compression internal combustion engine as in claim 5, wherein the operation of the first and second lubricating pumps are each controlled by a separate control each mapped to indicate lubricating requirements for the sliding surfaces and remaining components in response to engine conditions.

7. A lubricating system for a two-cycle crankcase compression internal combustion engine comprised of a cylinder, a plurality of cylinder bores formed by said cylinder, a plurality of pistons each supported for reciprocation within a respective one of said cylinder bores, a crankshaft rotatably journalled in a plurality of crankshaft chambers each formed at one end of a respective one of said cylinder bores and driven by said pistons, a cylinder head affixed to said cylinder at the other end of said cylinder bores forming with said pistons and said cylinder bores a plurality of combustion chambers the volume of which varies upon reciprocation of said pistons, an induction system for supplying a charge to said crankcase chamber, reed type check valves in said induction system for permitting air to flow into each of said crankcase chambers from said induction system means and precluding reverse flow from said crankcase chambers into said induction system means, a first lubricating system for delivering lubricant directly to said cylinder bores for lubricating the sliding surfaces of said piston and said cylinder bore, and a second lubricating system for delivering lubricant to said induction system upstream of said reed type check valves, each lubricating system including a plurality of lubricating pumps, one for each cylinder bore.

8. A lubricating system for a two-cycle crankcase compression internal combustion engine as in claim 7, wherein the control for each of the lubricating pumps controls the respective lubricating pump independently of the remaining lubricating pumps.

9. A lubricating system for a two-cycle crankcase compression internal combustion engine as in claim 8, further including means for draining lubricant from the crankcase chamber and delivering it back to the engine through the induction system.

10. A lubricating system for a two-cycle crankcase compression internal combustion engine comprised of a cylinder, at least one cylinder bore formed by said cylinder, a piston supported for reciprocation within said cylinder bore, a crankshaft rotatably journalled in a crankshaft chamber formed at one end of said cylinder bore and driven by said piston, a cylinder head affixed to said cylinder at the other end of said cylinder bore forming with said piston and said cylinder bore a combustion chamber the volume of which varies upon reciprocation of said piston, an induction system for supplying a charge to said crankcase chamber, a reed type check valve in said induction system for permitting air to flow into said crankcase chamber from said induction system means and precluding reverse flow from said crankcase chamber into said induction system means, a first lubricating system for delivering lubricant directly to said cylinder bore for lubricating the sliding surfaces of said piston and said cylinder bore, a second lubricating system for delivering lubricant to said induction system upstream of said reed type check valve, and a third lubricating system for delivering lubricant to said crankshaft.

11. A lubricating system for a two-cycle crankcase compression internal combustion engine as in claim 10, wherein the cylinder forms a plurality of cylinder bores each slidably supporting a piston connected to the crankshaft and wherein the first lubricating system has means for supplying lubricant to each of the cylinder bores and the second lubricating system has means for independently supplying lubricant to the induction systems of each of the cylinder bores.

12. A lubricating system for a two-cycle crankcase compression internal combustion engine as in claim 11, wherein the first, second and third lubricating systems each have means for independently controlling the amount of lubricant delivered by the respective system to the respective cylinder.

13. A lubricating system for a two-cycle crankcase compression internal combustion engine as in claim 12, wherein each lubricating system includes a plurality of lubricating pumps, one for each cylinder.

14. A lubricating system for a two-cycle crankcase compression internal combustion engine as in claim 13, further including means for draining lubricant from the crankcase chamber and delivering it back to the engine through the induction system.

* * * * *